United States Patent
Kunii et al.

(10) Patent No.: US 11,247,605 B2
(45) Date of Patent: Feb. 15, 2022

(54) IMAGE PROJECTION APPARATUS CONFIGURED TO PROJECT AN IMAGE ON A ROAD SURFACE

(71) Applicant: MAXELL, LTD., Kyoto (JP)

(72) Inventors: Yasuhiko Kunii, Kyoto (JP); Nobuyuki Kaku, Kyoto (JP); Toshinori Sugiyama, Kyoto (JP); Hiroyuki Nakamura, Kyoto (JP); Hiroshi Chiba, Kyoto (JP); Masahiro Kishigami, Kyoto (JP); Hiroyuki Kajikawa, Kyoto (JP); Chohei Ono, Kyoto (JP); Megumi Kurachi, Kyoto (JP); Noriaki Harada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 4 days.

(21) Appl. No.: 16/837,202

(22) Filed: Apr. 1, 2020

(65) Prior Publication Data

US 2020/0231085 A1    Jul. 23, 2020

Related U.S. Application Data

(63) Continuation of application No. 16/394,607, filed on Apr. 25, 2019, now Pat. No. 10,647,248, which is a continuation of application No. 15/565,543, filed as application No. PCT/JP2016/060613 on Mar. 31, 2016, now Pat. No. 10,457,199.

(30) Foreign Application Priority Data

Apr. 10, 2015    (JP) .................................. 2015-080901

(51) Int. Cl.
*B60Q 1/38* (2006.01)
*B60K 35/00* (2006.01)
(Continued)

(52) U.S. Cl.
CPC ............ *B60Q 1/38* (2013.01); *B60K 31/0008* (2013.01); *B60K 35/00* (2013.01); *B60Q 1/04* (2013.01);
(Continued)

(58) Field of Classification Search
CPC ........... G06T 7/70; G08G 1/161; G06F 3/017; G02B 27/4205; B60Q 1/50–1/525;
(Continued)

(56) References Cited

U.S. PATENT DOCUMENTS

2006/0250226 A1* 11/2006 Vogel ..................... H04L 29/06
340/441
2007/0280503 A1    12/2007 Kubota et al.
(Continued)

FOREIGN PATENT DOCUMENTS

| CN | 102371937 A | 3/2012 |
| CN | 103105715 A | 5/2013 |

(Continued)

OTHER PUBLICATIONS

Japanese Office Action received in corresponding Japanese Application No. 2019-145305 dated Jun. 9, 2020.
(Continued)

*Primary Examiner* — John W Miller
*Assistant Examiner* — Humam M Satti
(74) *Attorney, Agent, or Firm* — Mattingly & Malur, PC

(57) ABSTRACT

Information related to a vehicle can be displayed by projecting an image based on the information on a road surface or the like. An image projection apparatus that projects an image includes: an acquisition unit that acquires information to be displayed; and an image projection unit that projects the image based on the information to be displayed acquired by the acquisition unit.

12 Claims, 37 Drawing Sheets

(51) Int. Cl.
  *B60Q 1/50* (2006.01)
  *G03B 29/00* (2021.01)
  *H04N 9/31* (2006.01)
  *B60Q 1/04* (2006.01)
  *B60K 31/00* (2006.01)
  *B60Q 1/54* (2006.01)

(52) U.S. Cl.
  CPC ............... *B60Q 1/50* (2013.01); *B60Q 1/503* (2013.01); *B60Q 1/54* (2013.01); *G03B 29/00* (2013.01); *H04N 9/3141* (2013.01); *H04N 9/3179* (2013.01); *H04N 9/3185* (2013.01); *H04N 9/3194* (2013.01); *B60K 2370/179* (2019.05); *B60K 2370/334* (2019.05); *B60K 2370/5915* (2019.05); *B60K 2370/797* (2019.05); *B60Q 2300/45* (2013.01); *B60Q 2400/50* (2013.01); *B60W 2754/30* (2020.02)

(58) Field of Classification Search
  CPC .. B60Q 11/00; B60Q 11/007; B60Q 2400/50; B60Q 1/26; B60Q 1/38; B60Q 1/04; B60Q 2300/45; H04N 9/3179; H04N 9/3185; H04N 9/3194; H04N 9/3141; G03B 29/00; B60K 35/00; B60K 31/0008; B60K 2370/5915; B60K 2370/179; B60K 2370/334; B60K 2370/797; B60W 2754/30
  See application file for complete search history.

(56) References Cited

U.S. PATENT DOCUMENTS

| | | | |
|---|---|---|---|
| 2008/0167821 A1* | 7/2008 | Breed | G08G 1/161 701/301 |
| 2012/0044090 A1 | 2/2012 | Kahler et al. | |
| 2014/0028980 A1 | 1/2014 | Othmer | |
| 2015/0203023 A1* | 7/2015 | Marti | B60Q 1/503 340/425.5 |
| 2015/0298598 A1 | 10/2015 | Nüssli | |
| 2016/0031366 A1* | 2/2016 | White | G02B 27/4205 353/13 |
| 2016/0167648 A1* | 6/2016 | James | G06F 3/017 701/28 |
| 2016/0207448 A1* | 7/2016 | Galicia Badillo | B60Q 1/323 |
| 2016/0216521 A1 | 7/2016 | Yachida et al. | |
| 2017/0144591 A1 | 5/2017 | Katsu | |
| 2017/0182934 A1* | 6/2017 | Arita | G06T 7/70 |

FOREIGN PATENT DOCUMENTS

| | | |
|---|---|---|
| CN | 103963707 A | 8/2014 |
| JP | 08-043781 | 2/1996 |
| JP | 2004-136838 | 5/2004 |
| JP | 2007-323342 A | 12/2007 |
| JP | 2008-143505 | 6/2008 |
| JP | 2008-170742 | 7/2008 |
| JP | 2008-287669 | 11/2008 |
| JP | 2009-149152 A | 7/2009 |
| JP | 2010-026759 | 2/2010 |
| JP | 2012-247369 | 12/2012 |
| JP | 2014-153868 | 8/2014 |

OTHER PUBLICATIONS

International Search Report for WO 2016/163294 A1, dated Jun. 14, 2016.

Chinese Office Action dated Jun. 11, 2019 for the Chinese Patent Application No. 201680018479.9.

* cited by examiner

FIG. 9
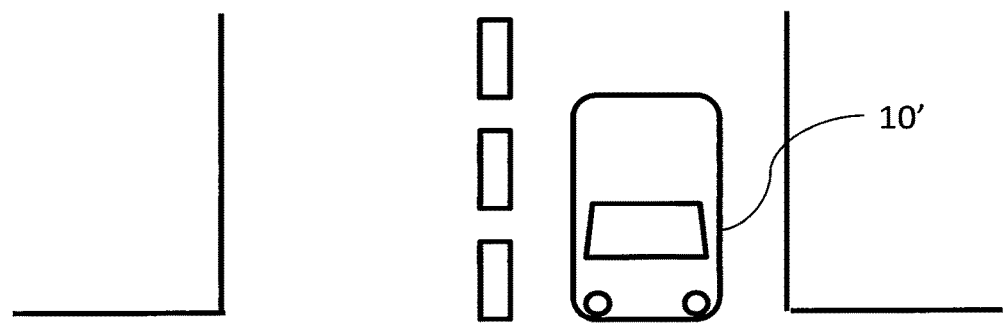
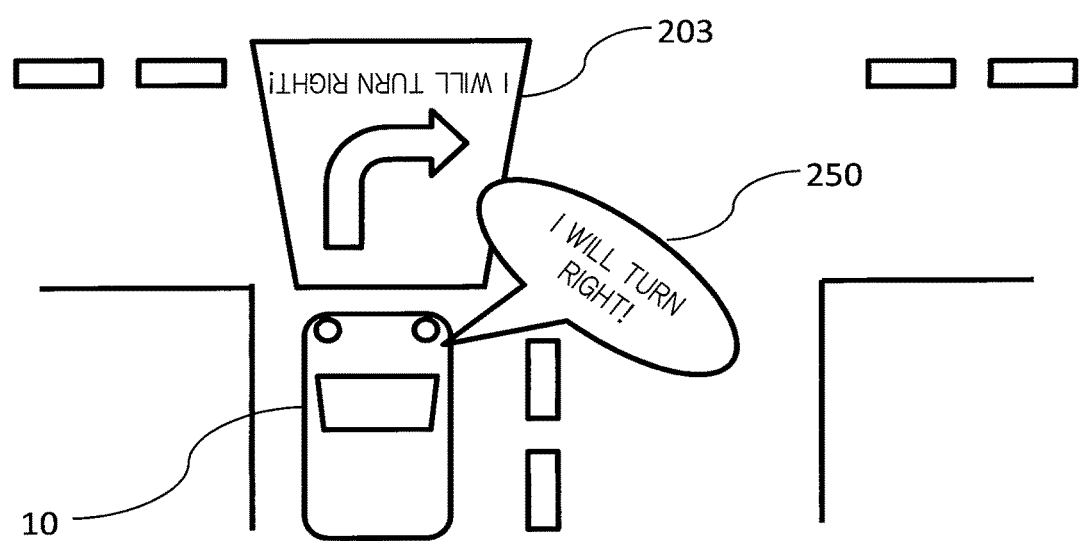

FIG. 25
(A) (B)
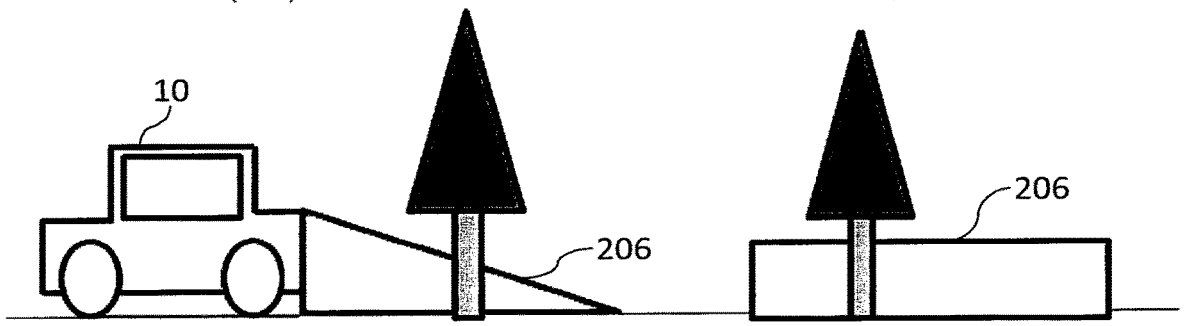
(C) (D)
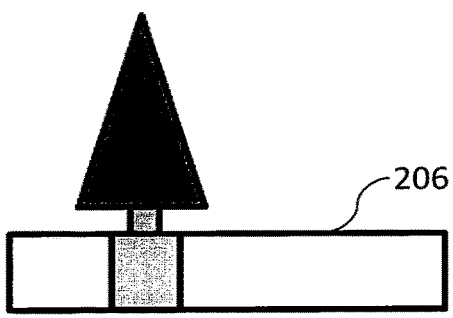 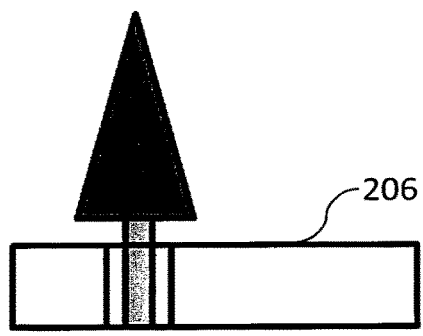

FIG. 30
(A)
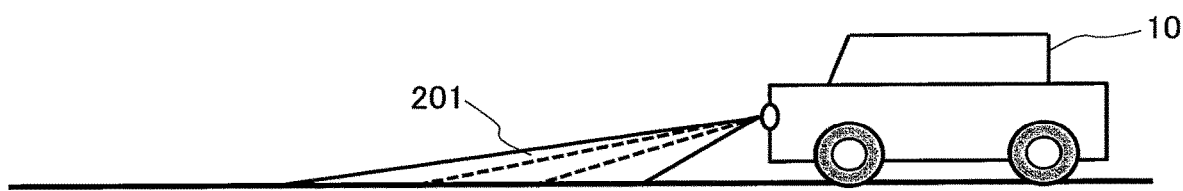
(B)
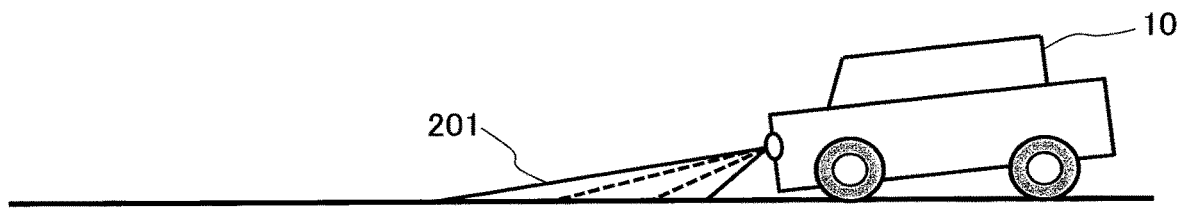
(C)
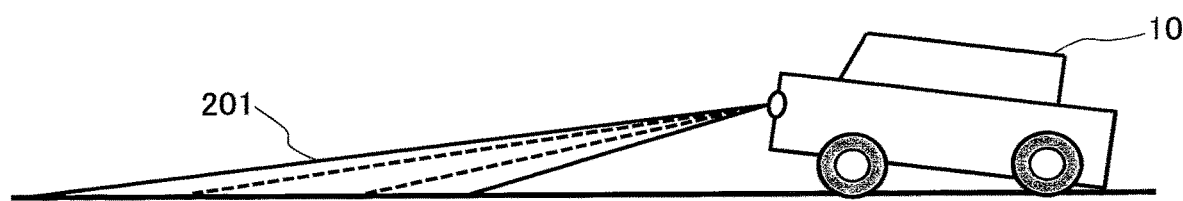

FIG. 34
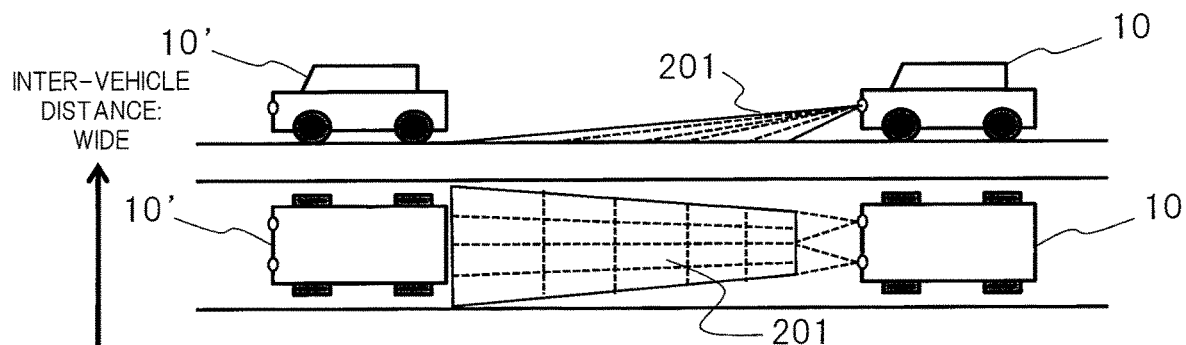
(A)
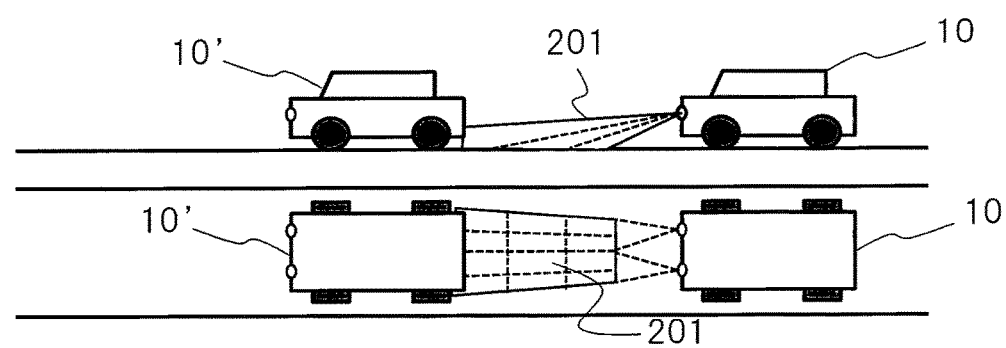
(B)
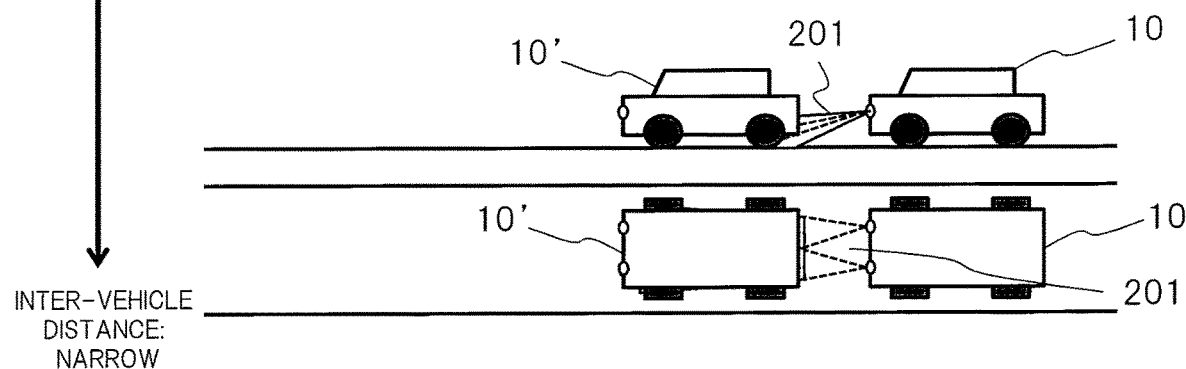
(C)

IMAGE PROJECTION APPARATUS CONFIGURED TO PROJECT AN IMAGE ON A ROAD SURFACE

CROSS-REFERENCE TO RELATED PATENT APPLICATIONS

This non-provisional U.S. patent application is a continuation of U.S. patent application Ser. No. 16/394,607, filed Apr. 25, 2019, which is a continuation of U.S. patent application Ser. No. 15/565,543 filed on Oct. 10, 2017, now U.S. Pat. No. 10,457,199, and claims priority under 35 U.S.C. § 119 of Japanese Patent Application No. 2015-213720, filed on Oct. 30, 2015, Japanese Patent Application No. 2015-080901 filed on Apr. 10, 2015 and international Patent Application No. PCT/JP2016/060613, filed on Mar. 31, 2016, the entire contents of which are hereby incorporated by reference.

TECHNICAL FIELD

The present invention relates to an image projection apparatus.

BACKGROUND ART

An image projection apparatus typified by a projector has already been used in various fields as an apparatus for projecting a desired image in an enlarged manner, and it has been widely used as a display device for a personal computer and a cellular phone in recent years.

Regarding such an image projection apparatus, those listed below have already been known as prior art techniques particularly related to the use in a vehicle.

RELATED ART DOCUMENTS

Patent Documents

Patent Document 1: Japanese Patent Application Laid-Open Publication No. H08-43781
Patent Document 2: Japanese Patent Application Laid-Open Publication No. 2004-136838
Patent Document 3: Japanese Patent Application Laid-Open Publication No. 2010-26759
Patent Document 4: Japanese Patent Application Laid-Open Publication No. 2012-247369
Patent Document 5: Japanese Patent Application Laid-Open Publication No. 2014-153868

SUMMARY OF THE INVENTION

Problems to be Solved by the Invention

Namely, Patent Document 1 described above discloses a projection type display apparatus which uses a vehicle headlight as an external light source by disposing an LCD projector, which incorporates no light source and is excellent in portability, in front of the vehicle headlight. In Patent Document 2, a first state in which the projector is incorporated in front of the headlight in the vehicle in advance and a second state in which the projector or the headlight is moved to emit light flux from the headlight directly to the outside of the vehicle are realized for solving a problem of Patent Document 1, and further an embodiment in which an image is displayed on a road is disclosed.

Also, an apparatus for vehicle driving support which, in order to effectively arouse attention of a driver of a vehicle at the time of determination of lane departure, displays information for promoting attention on a road ahead of a vehicle by irradiation means (laser) attached to a headlight part in front of the vehicle is known by Patent Document 3.

In addition, an apparatus which is provided with a projector as projection means attached at a front part of a vehicle and projects a route guide image for guiding the vehicle in a branching direction based on route information searched by a navigation system on a road surface ahead of the vehicle, with a setting of a projection angle is already known by Patent Document 4. Further, an apparatus for vehicle driving support which enables recognition of a place where a vehicle is heading by projecting a drawing pattern made up of target marks and tracking lines on a road surface ahead of the vehicle based on a traveling state of the vehicle, and thus enables proper driving based thereon is already known by Patent Document 5.

However, the conventional techniques described above have not necessarily displayed effectively various types of information necessary for traveling of the vehicle.

Thus, the present invention has been made in view of the problems in the conventional techniques described above, and an object thereof is to provide an image projection apparatus capable of projecting and displaying various types of information on a road surface, wall surface, or a vehicle (hereinafter, road surface or the like) based on information related to the vehicle such as the traveling state and the like of the vehicle (mobile body typified by automobile or the like).

Means for Solving the Problems

To solve the problems mentioned above, for example, a configuration described in CLAIMS is adopted. The present application includes a plurality of means to solve the problems and an example thereof is an image projection apparatus that projects an image, and the image projection apparatus includes: an acquisition unit that acquires information to be displayed; and an image projection unit that projects the image based on the information to be displayed acquired by the acquisition unit.

Effects of the Invention

According to the present invention, it is possible to provide an image projection apparatus capable of projecting and displaying information on a road surface or the like based on information related to a vehicle.

BRIEF DESCRIPTIONS OF THE DRAWINGS

FIG. 1 is a front perspective view of a vehicle which mounts an image projection apparatus according to an embodiment of the present invention and projects an image on a road surface or the like;

FIG. 2 is a rear perspective view of a vehicle which mounts the image projection apparatus according to the embodiment of the present invention and projects an image on a road surface or the like;

FIG. 9 is a diagram illustrating a specific example of various images projected from a projector onto the road surface based on a relationship with vehicle information;

FIG. 25 is a diagram illustrating a specific example of various images projected from a projector onto the road surface based on a relationship with vehicle information;

FIG. 30 is a diagram illustrating a further specific example of various images projected from a projector onto the road surface based on a relationship with vehicle information;

FIG. 34 is a diagram illustrating a further specific example of various images projected from a projector onto the road surface based on a relationship with vehicle information;

DETAILED DESCRIPTION OF PREFERRED EMBODIMENTS

Hereinafter, embodiments of the present invention will be described in detail with reference to the accompanying drawings.

<Arrangement of Image Projection Apparatus>

Figure 1:
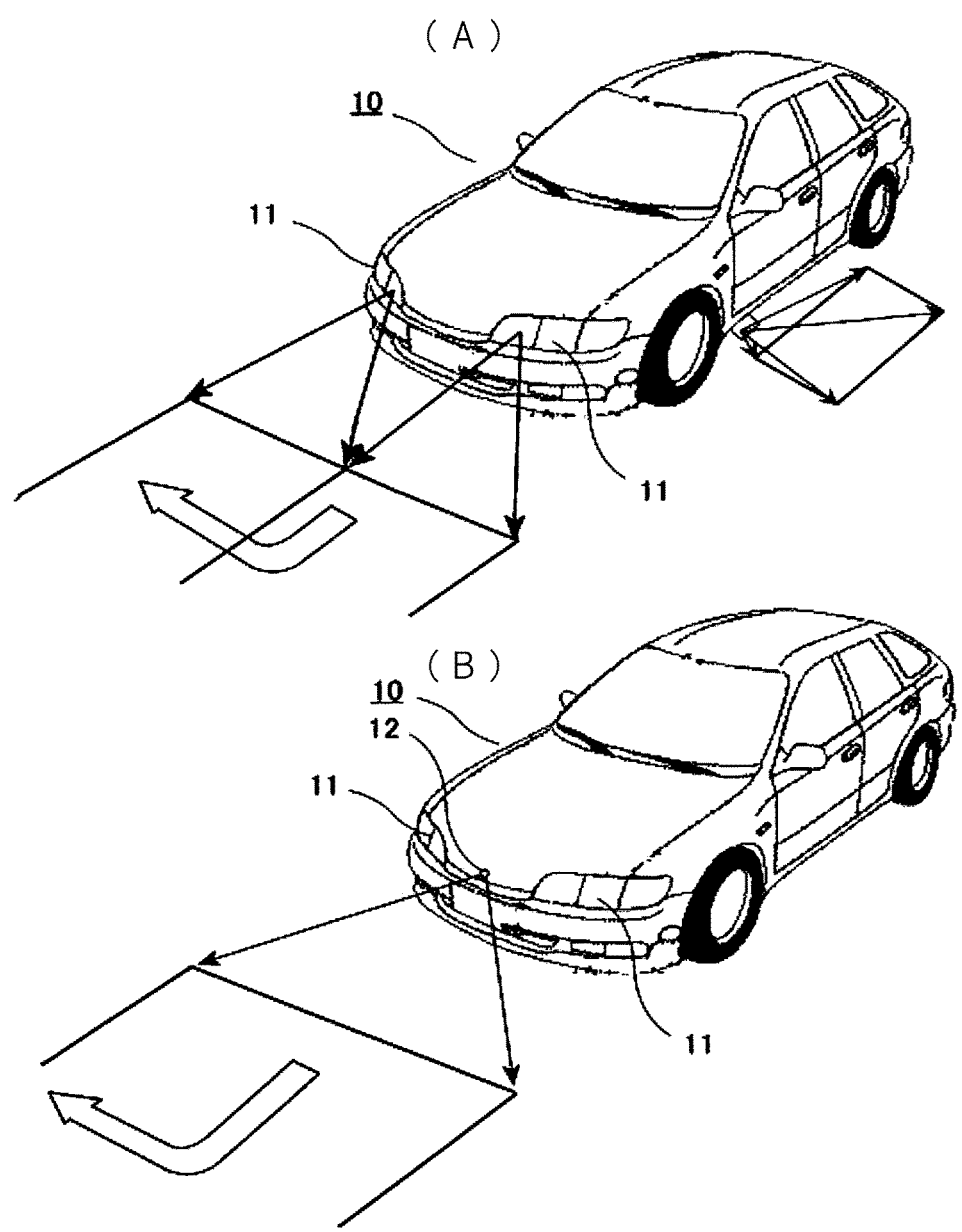

First, FIGS. 1(A) and 1(B) illustrate a passenger car as an example of a vehicle 10 which mounts an image projection apparatus according to an embodiment of the present invention, and as illustrated in these figures, a pair of left and right headlights 11 is provided in front of a main body of the vehicle 10.

In the example of FIG. 1(A), although not illustrated in detail here, a lamp as a light emitter is incorporated in each of the pair of headlights 11. Also, in the example of FIG. 1(A), a pair of left and right image projection apparatuses described in detail below is mounted in the vehicle (passenger car) 10. Then, image light from the image projection apparatuses is projected ahead of the vehicle (passenger car) 10 through, for example, transparent window parts. In this example, an image projected on a road surface or the like indicates a current or subsequent traveling direction to a pedestrian or the like walking near the vehicle (passenger car) 10, thereby ensuring higher safety.

FIG. 1(B) illustrates an example in which only one image projection apparatus is mounted on a front part of a vehicle body. In this case, image light from the image projection apparatus is projected ahead of the vehicle (passenger car) 10 through, for example, a transparent window part 12 provided at the front part of the vehicle body.

Further, as also illustrated in FIG. 1(A), the image projection apparatus is mounted also on the bottom and the side of the vehicle (passenger car) 10, and it is thus possible to project a desired image on the road surface or the like adjacent to both sides of the vehicle (passenger car) 10.

Figure 2:
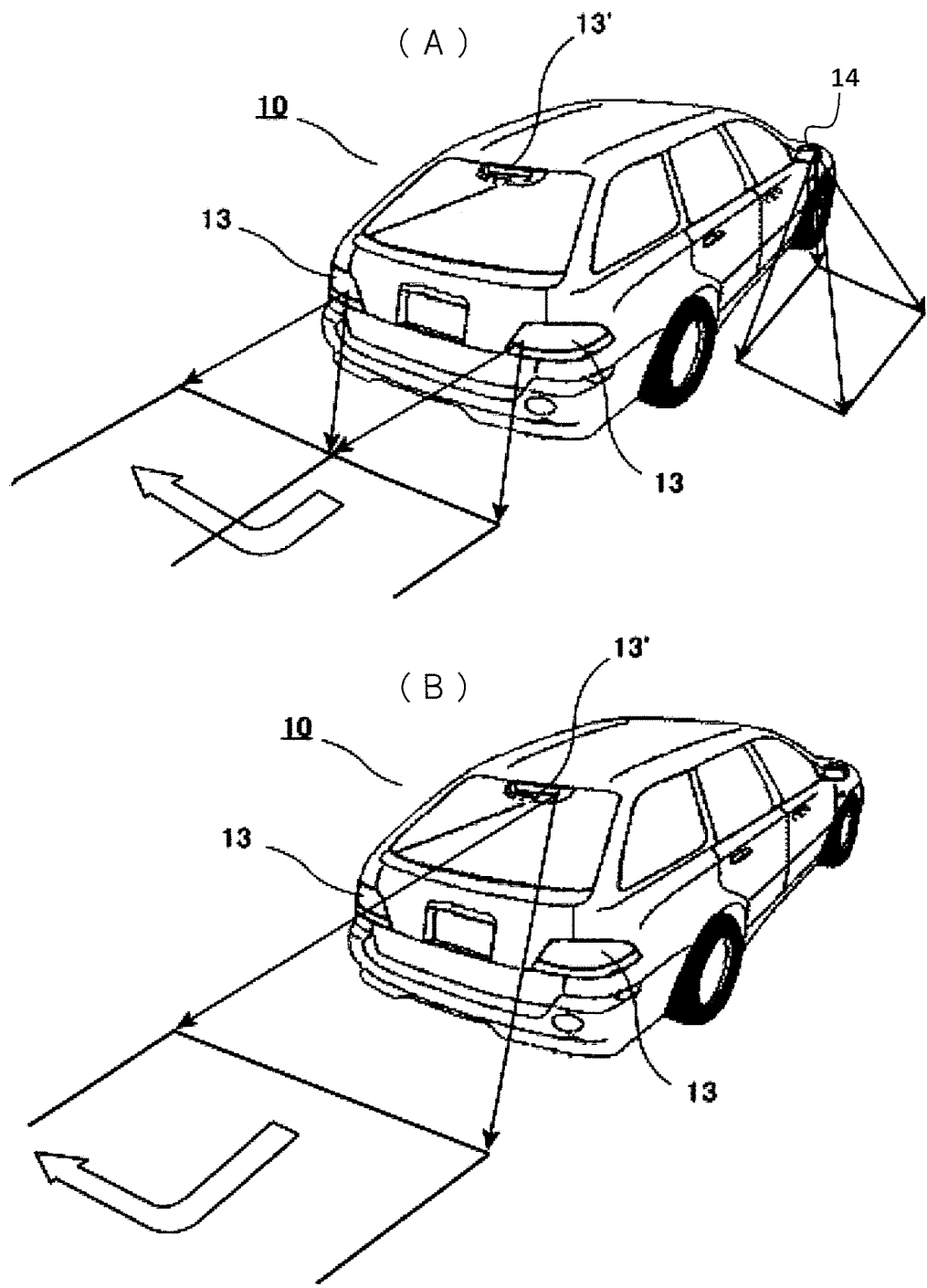

Subsequently, FIGS. 2(A) and 2(B) illustrate a rear side of the vehicle (passenger car) 10 which mounts the image projection apparatus according to the embodiment of the present invention, and as illustrated in these figures, red tail lamps 13 and 13' are provided on the rear side of the vehicle body. Further, in the example of FIG. 2(A), although not illustrated in detail here again, a lamp as a light emitter is incorporated in each of these tail lamps 13 and 13'. Also, in the example of FIG. 2(A), a pair of left and right image projection apparatuses is mounted, and image light from the image projection apparatuses is projected behind the vehicle (passenger car) 10 through, for example, transparent window parts.

FIG. 2(B) illustrates an example in which the image projection apparatus is mounted near the roof of the vehicle body. In the example of FIG. 2(B), similarly to the example of FIG. 1(B), the image light is projected behind the passenger car 10 through a transparent window part provided at a rear end of the vehicle body.

Further, as also illustrated in FIG. 2(A), the image projection apparatus is mounted also in a side mirror 14, and it is thus possible to project a desired image on the road surface or the like adjacent to both sides of the vehicle 10.

In the foregoing, examples in which one or plural (for example, a pair of) image projection apparatuses are mounted on the front, back, left, and right of the vehicle 10 have been described, but the present invention is not limited to these, and the image projection apparatus may be mounted at any location (for example, on the roof or the like) of the vehicle 10. Also, the image projection apparatus may be integrally incorporated in the headlight or the tail lamp. Namely, in the present invention, the image projection apparatus may be mounted at any location as long as a desired image can be projected on the road surface or the like by the image projection apparatus. In a case where the image projection apparatus is integrally incorporated in the headlight or the tail lamp, a light source of the headlight or the tail lamp can be used also as a light source for projection.

<Configuration of Light Control ECU>

Figure 3:
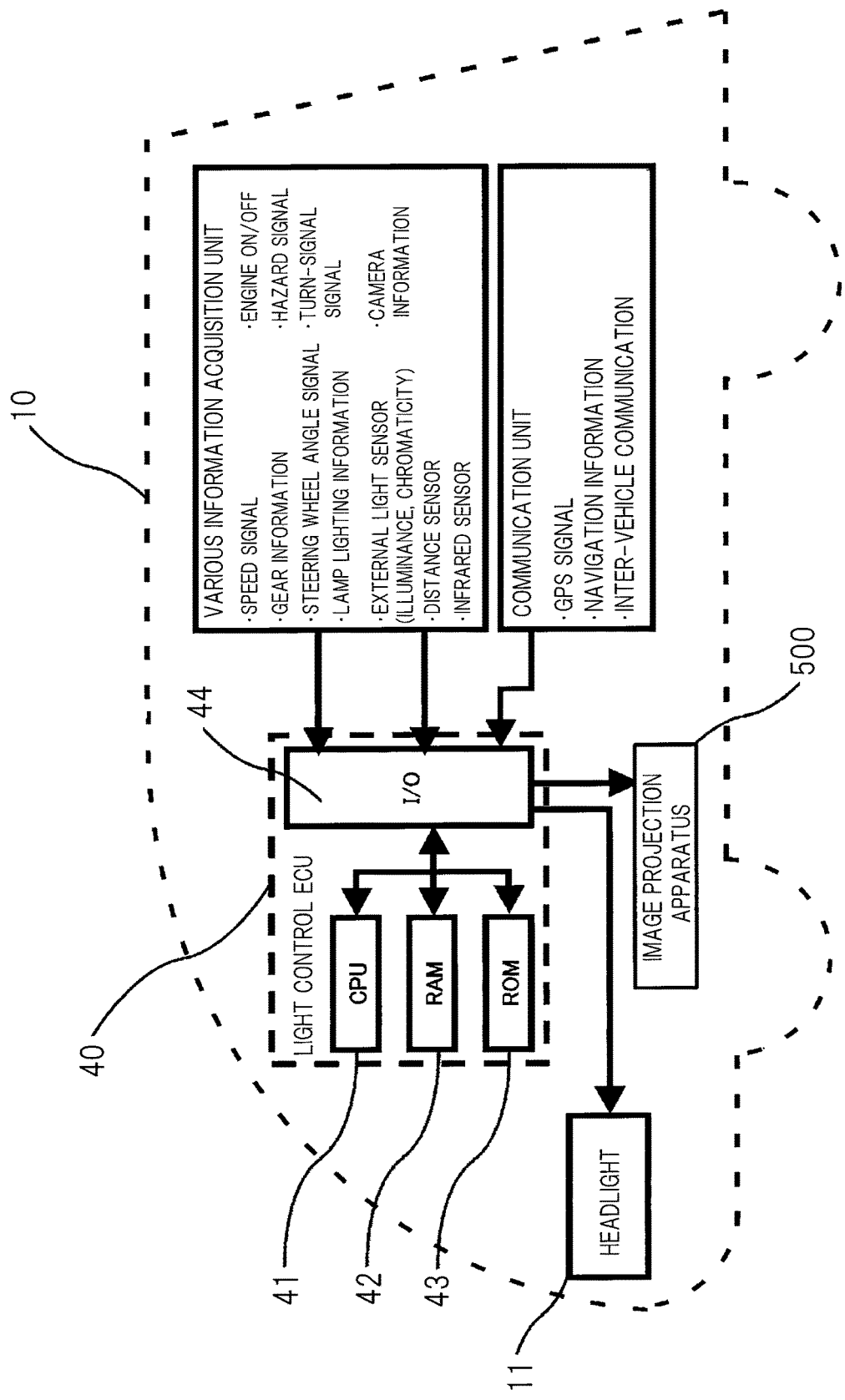
FIG. 3 is a diagram illustrating an overall configuration of a light control ECU constituting the image projection apparatus.

Subsequently, FIG. 3 illustrates an example of a configuration of an electronic control unit (light control ECU) mounted in the vehicle (passenger car) 10 described above. As apparent from the figure, a light control ECU 40 includes a CPU (Central Processing Unit) 41, RAM 42 and ROM 43 as storage means, and an input/output device (I/O unit) 44. The light control ECU receives information input from a various information acquisition unit and a communication unit described below via the I/O unit 44, and controls driving of the headlight 11 and image projection of an image projection apparatus 500.

Note that the information from the various information acquisition unit includes, for example, a speed signal indicating a traveling speed of the vehicle 10, a signal indicating an engine state (ON/OFF), gear information indicating a gear position, a hazard signal notifying surrounding drivers of existence of danger, a steering wheel angle signal indicating a steering angle of a steering wheel, a turn-signal signal indicating presence/absence of a turn signal (referred to also as a "blinker") and which of the left and right is lighting/blinking, and further lamp lighting information indicating lighting/blinking states of the various lamps.

The information from the various information acquisition unit further includes, for example, information from an external light sensor which detects light outside the vehicle (illuminance signal, chromaticity signal, and the like), image information from a camera attached to the vehicle, a signal from a distance sensor which detects a distance to another vehicle running around the vehicle 10 such as in front of it or other objects, and further a signal from an infrared sensor which detects a situation outside the vehicle in the nighttime.

In addition, the information from the communication unit includes, for example, a GPS (Global Positioning System) signal for determining a position of the vehicle 10, so-called navigation information that is information from a navigation device which performs route guidance and the like, and further information of inter-vehicle communication performed with another vehicle and road-to-vehicle communication performed between the road and the vehicle.

Figure 4:
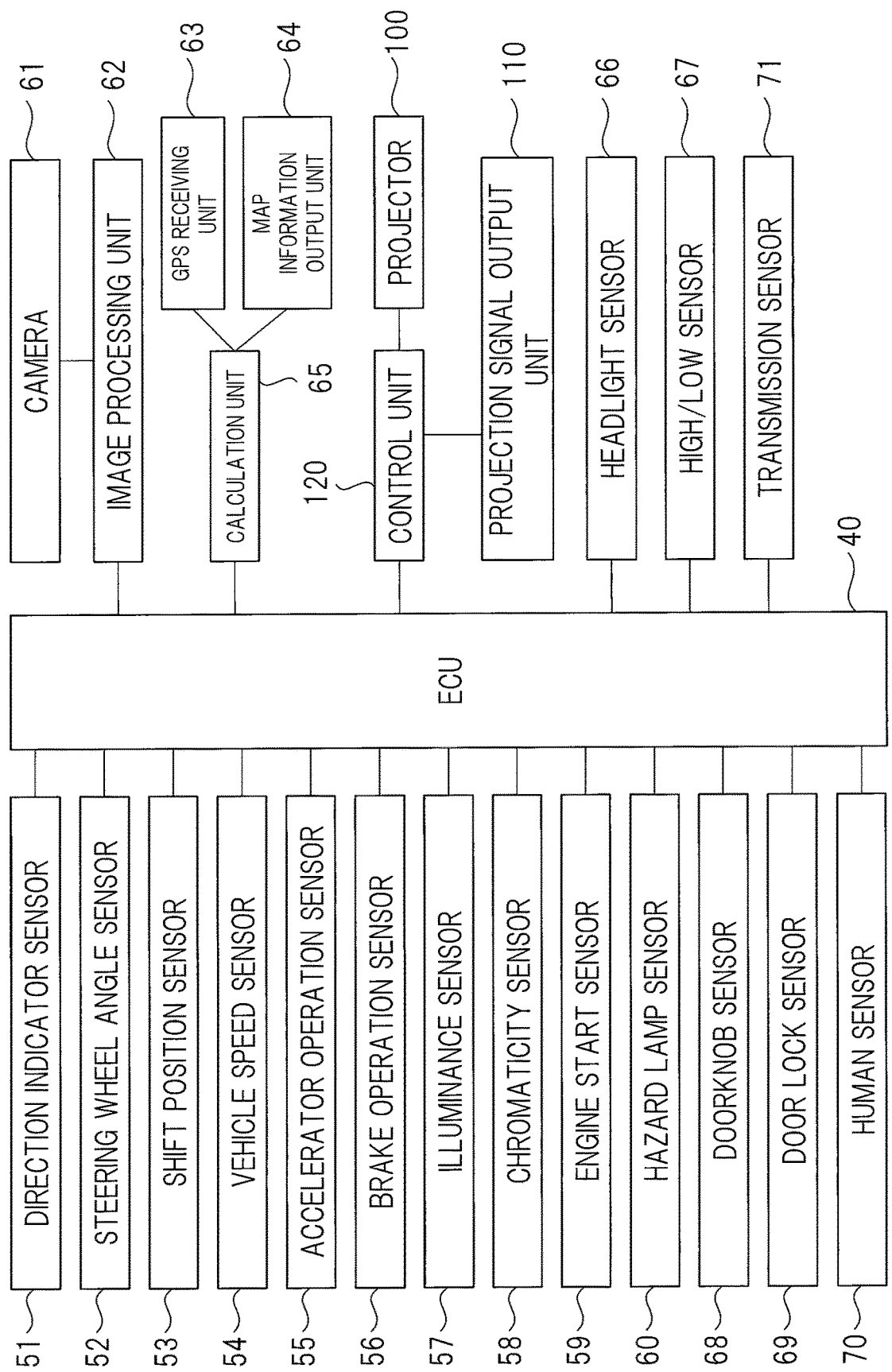
FIG. 4 is a block diagram illustrating a further detailed configuration example of the light control ECU and its peripheral elements.

FIG. 4 illustrates a further detailed configuration of the light control ECU 40 and its peripheral elements described above. Namely, signals from a direction indicator sensor 51, a steering wheel angle sensor 52 for detecting an operation angle of a steering wheel (steering angle), a shift position sensor 53, a vehicle speed sensor 54, an accelerator operation sensor 55, a brake operation sensor 56, an illuminance sensor 57, a chromaticity sensor 58, an engine start sensor 59, and a hazard lamp sensor 60 are input to the light control ECU 40 in FIG. 4. Further, a doorknob sensor 68 for detecting that a driver or a passenger holds a doorknob, a door lock sensor 69 for detecting an open/close state of a door including a half-opened door, a human sensor 70 for detecting that there is no human in a vehicle based on, for example, a load on a seat, and a transmission sensor 71 for detecting a position of a transmission gear are provided. A signal from a camera 61 is input to the ECU 40 via an image processing unit 62, and signals from a GPS receiving unit 63 and a map information output unit 64 are input to the ECU 40 via a calculation unit 65.

Also, a projector 100 constituting the image projection apparatus 500 receives a control signal input from the light control ECU 40 and a signal input from a projection signal output unit 110 (image signal projected on the road surface or the like) via a control unit 120, whereby projection of an image onto the road surface or the like described below is executed.

In addition, the light control ECU 40 further receives signals input from a headlight sensor 66 and a high/low sensor 67.

<Image Projection Apparatus>

Figure 5:
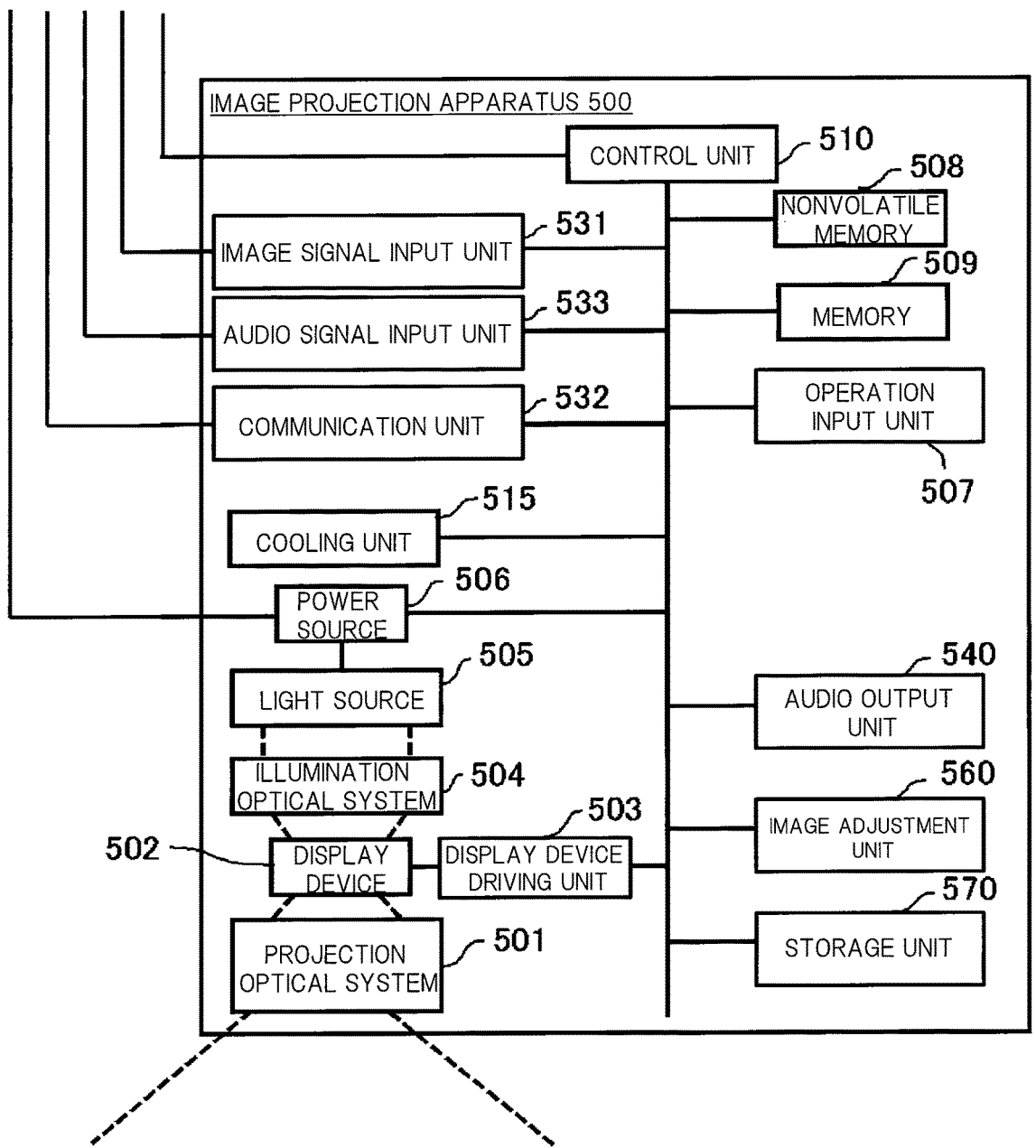
FIG. 5 is a diagram illustrating an example of a configuration of the image projection apparatus according to the embodiment of the present invention.

Subsequently, an example of a further detailed configuration of the image projection apparatus 500 including the projector 100, the projection signal output unit 110, and the control unit 120 illustrated in FIG. 4 will be described below with reference to FIG. 5.

A projection optical system 501 is an optical system for projecting an image onto the road surface or the like, and includes a lens and/or a mirror. A display device 502 is a device which generates an image by modulating transmitting light or reflecting light, and for example, a transmissive liquid crystal panel, a reflective liquid crystal panel, or a DMD (Digital Micromirror Device) panel (registered trademark) is used. A display device driving unit 503 sends a driving signal to the display device 502, and causes the display device 502 to generate an image. A light source 505 generates light for image projection, and a high pressure mercury lamp, a xenon lamp, an LED light source, a laser light source, or the like is used. A power source 506 supplies power to the light source 505. Further, the power source 506 supplies necessary power to each of other units. An illumination optical system 504 collects and uniformizes the light generated by the light source 505, and emits the light to the display device 502. A cooling unit 515 cools each part to be in a high temperature state such as the light source 505, the power source 506, or the display device 502 by an air cooling method or a liquid cooling method as necessary. An operation input unit 507 is an operation button or alight receiving unit of a remote controller, and receives an operation signal input from a user.

An image signal input unit 531 is connected to an external image output device to receive image data input from the external image output device. An audio signal input unit 533 is connected to an external audio output device to receive audio data input from the external audio output device. An audio output unit 540 is capable of outputting audio based on the audio data input to the audio signal input unit 533. Also, the audio output unit 540 may output an incorporated operation sound or error warning sound. A communication unit 532 is connected to, for example, an external information processing device to input and output various control signals.

A nonvolatile memory 508 stores various data to be used in a projector function. The data stored in the nonvolatile memory 508 includes picture data and image data prepared in advance for the projection onto the road. A memory 509 stores the image data to be projected and control parameters of each unit of the apparatus. A control unit 510 controls operation of each of connected units.

An image adjustment unit 560 performs image processing to the image data input by the image signal input unit 531 and the picture data and the image data stored in the nonvolatile memory 508. The image processing includes, for example, scaling processing that performs enlargement, reduction, and deformation of the image, brightness adjustment processing that changes brightness, contrast adjustment processing that changes a contrast curve of the image, and retinex processing that decomposes the image into light components and changes weighting for each component.

A storage unit 570 records the image, picture, audio, and various data. For example, the image, picture, audio, and various data may be recorded in advance at the time of product shipment, or the image, picture, audio, and various data acquired from an external device, an external server, or the like via the communication unit 532 may be recorded. The image, picture, various data and the like recorded in the storage unit 570 may be output as a projection image via the display device 502 and the projection optical system 501. The audio recorded in the storage unit 570 may be output as audio from the audio output unit 540.

As described above, the image projection apparatus 500 can mount various functions. However, the image projection apparatus 500 does not necessarily have to include all the configurations described above. The image projection apparatus 500 may have any configuration as long as it has a function of projecting the image.

Figure 6:
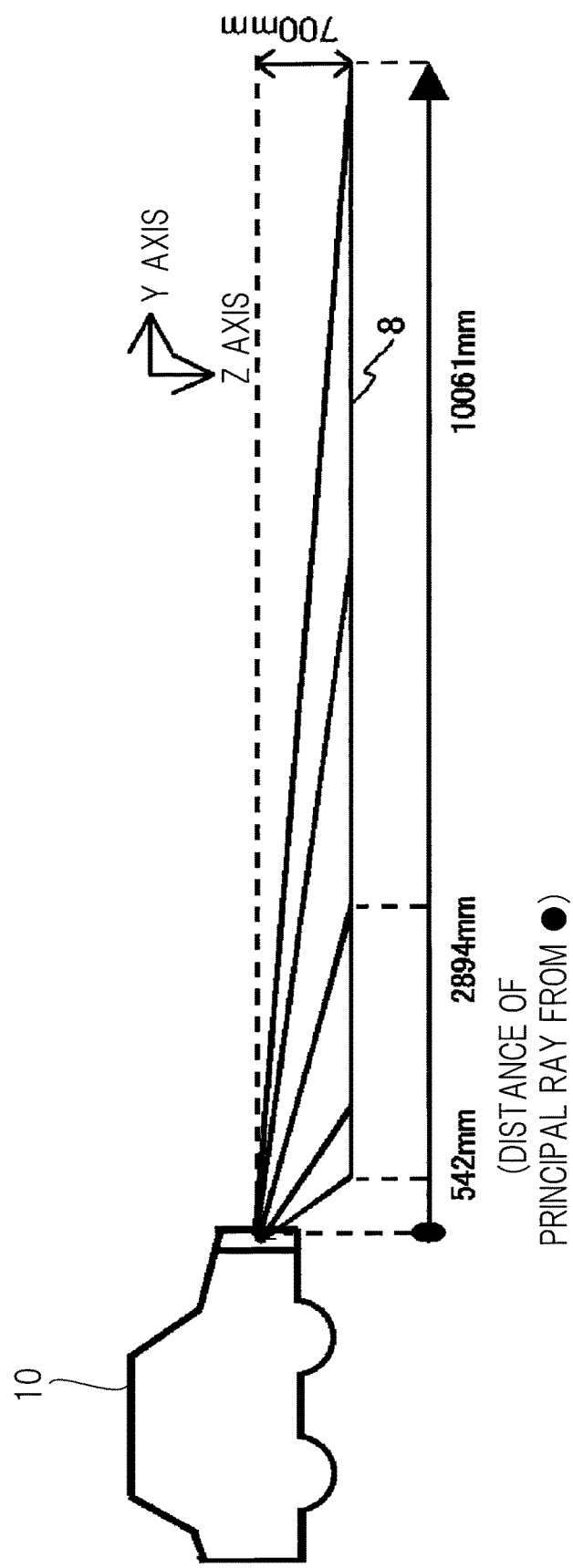
FIG. 6 is a ray diagram including an image plane of a projector.

FIG. 6 is a ray diagram of a projector including an image plane. In this figure, the image light, which is emitted from the light source constituted of an LED or the like (not illustrated) and transmits through the image display device, passes through a filter and the like, is refracted by various lens systems, and is further reflected in accordance with the configuration, and is then projected on an image plane 8 (road surface or the like).

In this manner, in the image projection apparatus 500 described above, the length of the long side of the range of the projection image is 10061−542=9519≈9520 mm with respect to the projection distance of 700 mm, and thus an unprecedented wide angle of view with the projection ratio of 700/9520=0.07 is realized.

In the foregoing, one image projection apparatus 500 and the projection optical system thereof have been described, but as described above, one or plural (for example, a pair of) projectors may be mounted on the vehicle (or integrally incorporated in the headlights or tail lamps) in the present invention so that a desired image is projected on the road surface or the like. At that time, in a case of the plural (for example, the pair of) image projection apparatuses 500 as illustrated in FIG. 1(A) and FIG. 2(A) in particular, the same image may be projected on the road surface or the like from each of the image projection apparatuses 500 (in this case, the same image is displayed on the display device 502 of FIG. 5), or different images may be projected from the left and right image projection apparatuses 500 and synthesized together on the road surface or the like (in this case, an image obtained by dividing the desired image into left and right is displayed on the display device 502 of FIG. 5).

In the foregoing, as the image projection apparatus 500 that projects the image on the road surface or the like, the configuration using the transmissive liquid crystal image display device has been described, but the present invention is not limited thereto. For example, a reflective image projection apparatus 500 constituted of a micromirror such as a DLP (Digital Light Processing) apparatus and an image projection apparatus 500 capable of projecting image light from a light modulable planar light emitting diode via the projection optical system can also be used as the image projection apparatus 500 in addition to that described above. Namely, in the present invention, any image projection apparatus 500 may be used as long as the desired image can be projected on the road surface or the like by the image projection apparatus 500.

<Projection Image of Various Types of Information Displayed on Road Surface or the Like>

Hereinafter, specific examples of various images projected on the road surface or the like based on a relationship with vehicle information by the image projection apparatus 500 described in detail above and mounted on the front and/or rear of the vehicle body in the above-described manner will be described in detail with reference to FIGS. 7 to 26.

By the image projection apparatus 500 installed at various locations of the vehicle 10 described above, it is possible to display not only a state of the vehicle 10 described above but also an intention of the driver of the vehicle 10 and the like.

Figure 7:
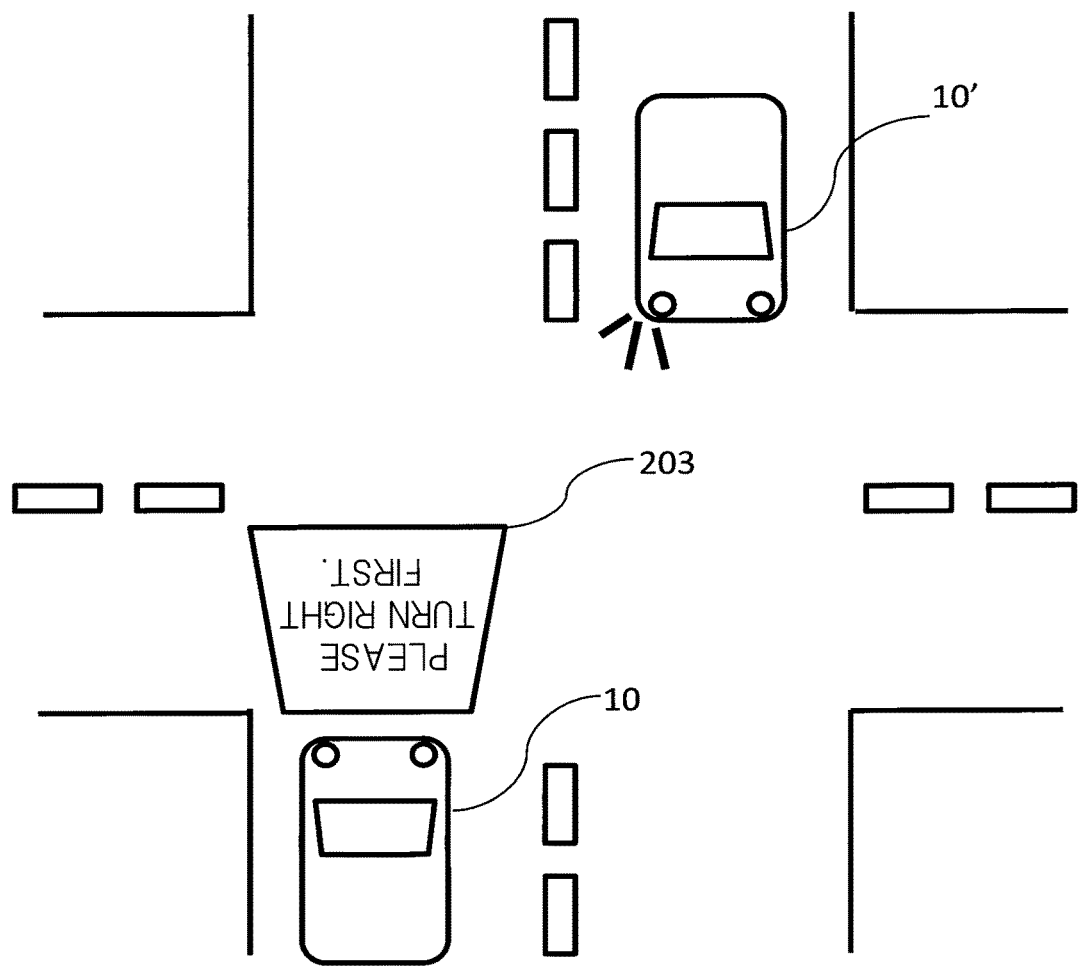
FIG. 7 is a diagram illustrating a specific example of various images projected from a projector onto the road surface based on a relationship with vehicle information.
Figure 8:
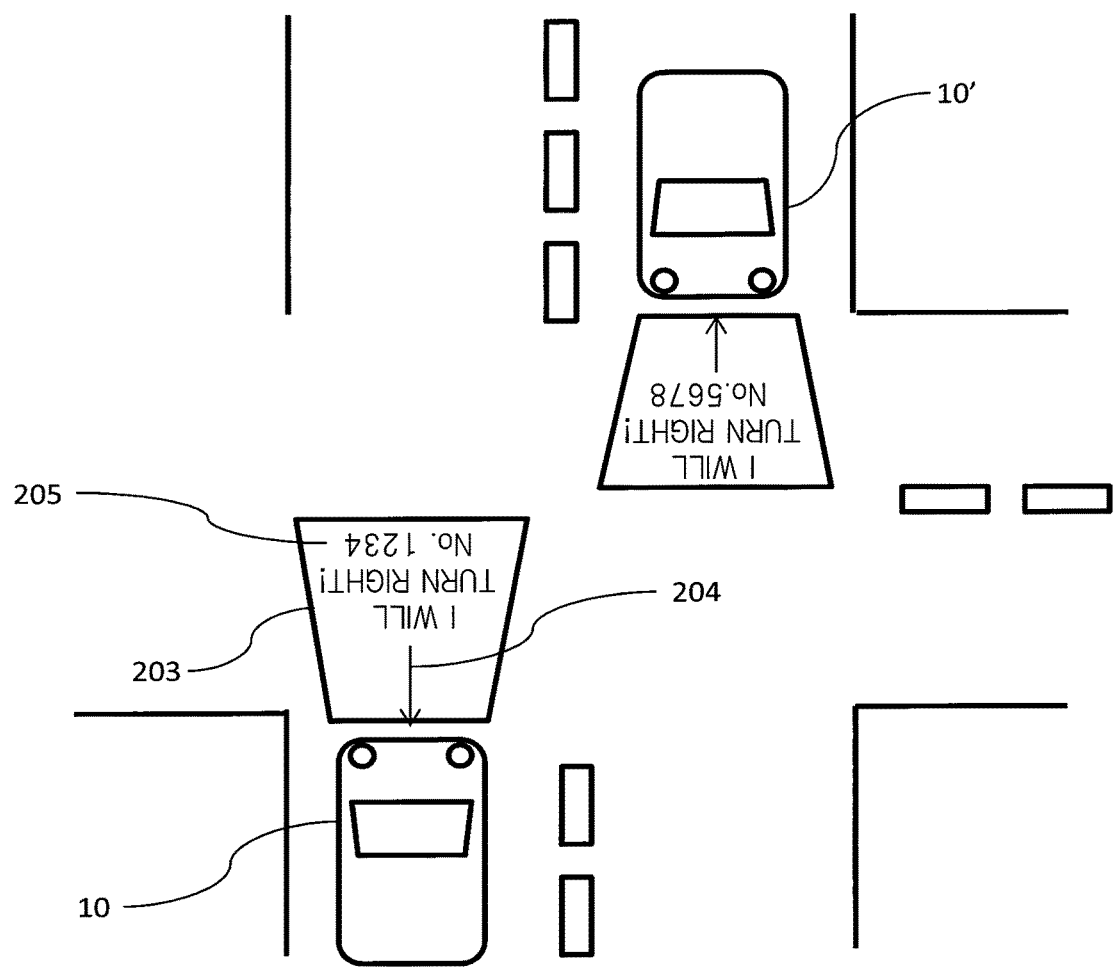
FIG. 8 is a diagram illustrating a specific example of various images projected from a projector onto the road surface based on a relationship with vehicle information.

FIG. 7 illustrates an example in which a message is displayed to another nearby vehicle in a state where the vehicle 10 stops at an intersection or the like, and a projection image 203 indicating, for example, "please turn right first" is displayed ahead of the vehicle 10 to another oncoming vehicle 10' that displays right turn indication by lighting a turning light in this example.

Note that, regarding the display described above, an image to be displayed is stored in advance in the memory 509 (see FIG. 5) that is storage means constituting the light control ECU, and the image is called with a switch or the like provided on a dashboard or the like and is displayed by the image projection apparatus 500. At that time, as also illustrated in FIG. 10, it is preferable to perform display in orientation opposite to usual orientation so as to make it easy for the driver of the other oncoming vehicle 10' to recognize displayed contents.

In addition, when displaying the message described above, as also illustrated in FIG. 8, a display region of the message may be made trapezoidal or triangular or an arrow 204 indicating a direction of the vehicle that is displaying the message, a vehicle plate number 205, or the like may be included in a part of the displayed projection image 203 so as to make it easy to recognize which vehicle is displaying the message. Alternatively, although not illustrated here, an animation may be used.

Meanwhile, as also illustrated in FIG. 9, the message may be transmitted by sounding the contents of the projection image 203 as a voice 250 in combination with the display of the projection image 203.

Figure 10:
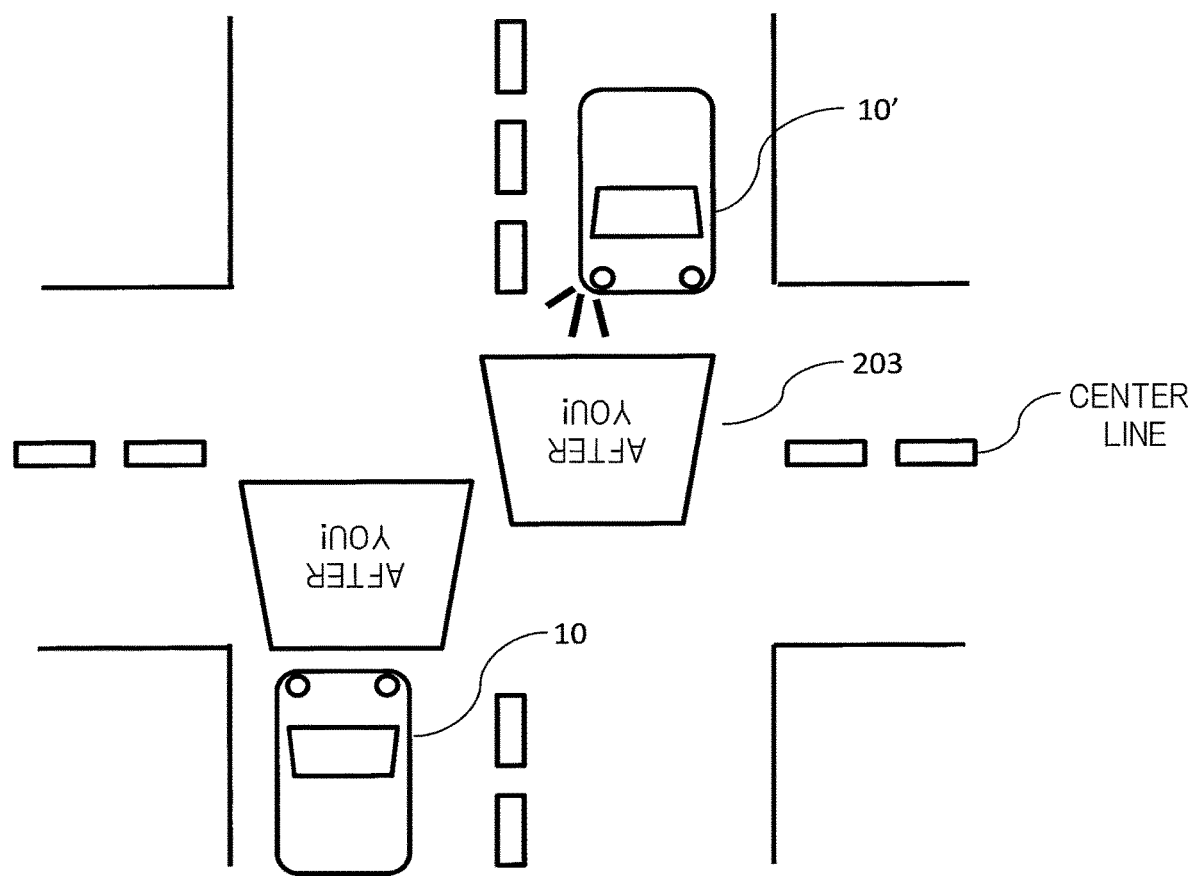
FIG. 10 is a diagram illustrating a specific example of various images projected from a projector onto the road surface based on a relationship with vehicle information.

Further, as also illustrated in FIG. 10, the projection image 203 may be displayed ahead of the other vehicle 10'.

Figure 11:
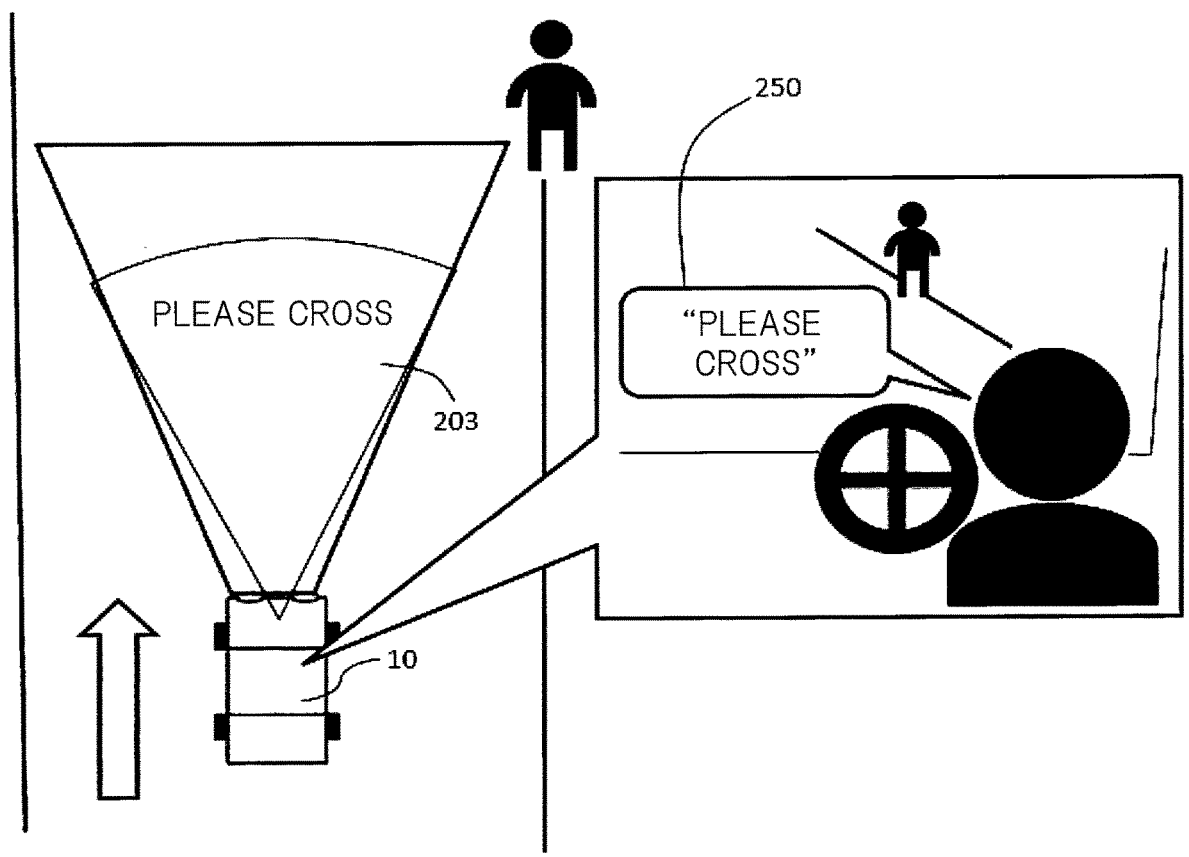
FIG. 11 is a diagram illustrating a specific example of various images projected from a projector onto the road surface based on a relationship with vehicle information.
Figure 12:
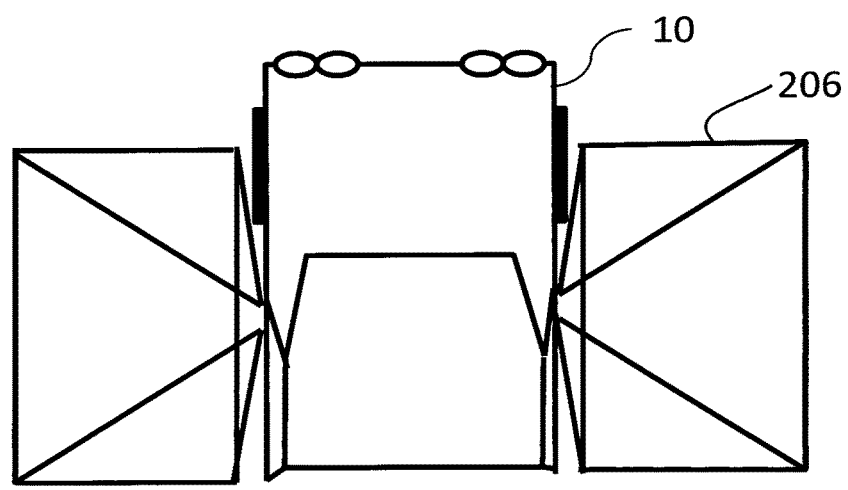
FIG. 12 is a diagram illustrating a specific example of various images projected from a projector onto the road surface based on a relationship with vehicle information.
Figure 13:
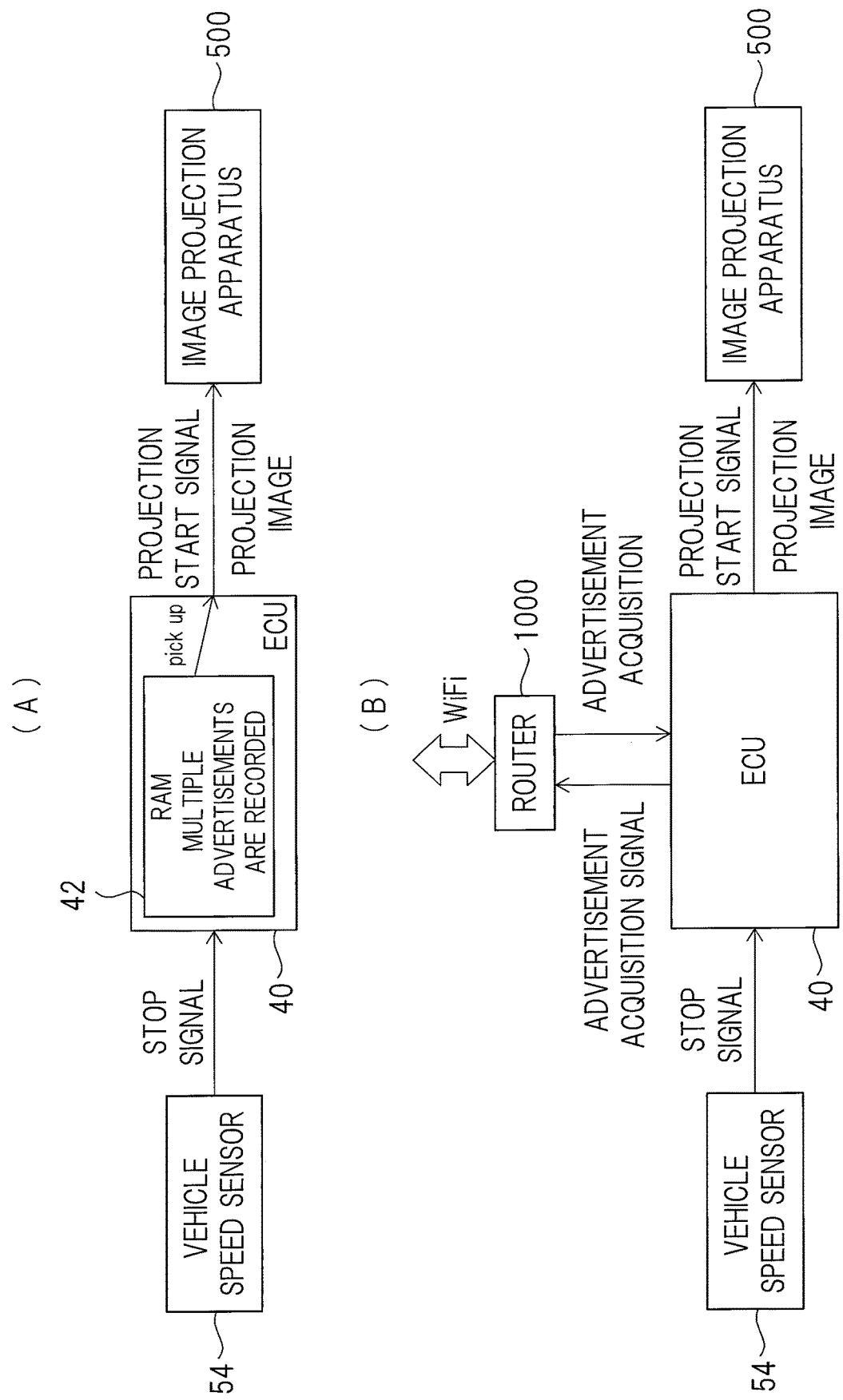
FIG. 13 is a diagram illustrating a specific example of various images projected from a projector onto the road surface based on a relationship with vehicle information.

Note that, as also illustrated in FIG. 11, the display of the message or the like described above can be performed to the pedestrian or the like who is trying to cross the front of the vehicle 10 in the same manner described above. In that case, the message or the like can be transmitted to the pedestrians or the like more effectively by the voice through a speaker provided on the vehicle 10 in addition to the display of the message 203 or the like. In that case, for example, an audio signal stored in advance in the memory 509 (see FIG. 5) may be used, or the voice 250 of the driver of the vehicle 10 may be transmitted through a microphone provided on the dashboard or the like.

Further, regarding the display of the message described above, as also illustrated in FIG. 12, it can be considered that a message 206 showing advertisement contents or the like may be displayed on the road surface or the like adjacent to a rear door particularly when the vehicle 10 is a taxi. Alternatively, although not illustrated here, in a vehicle for a public service such as a bus, a train, or the like, it can be considered that the advertisement content message 206 may be displayed in an entrance thereof.

In addition, regarding the display of the advertisement content message 206 described above, for example, as illustrated in FIG. 13(A), the ECU 40 may be configured to select a plurality of advertisements stored in the RAM 42 upon reception of a stop signal from the vehicle speed sensor 54 illustrated also in FIG. 4 and display the advertisement message via the image projection apparatus 500. At that time, only one or a predetermined number of different advertisements may be displayed for each stop, or a plurality of advertisements may be sequentially displayed for a predetermined period of time.

Alternatively, as illustrated in FIG. 13(B), by further providing a router 1000, the ECU 40 may acquire advertisement information from the outside of the vehicle 10 by WiFi and display the acquired advertisement contents.

Figure 14:
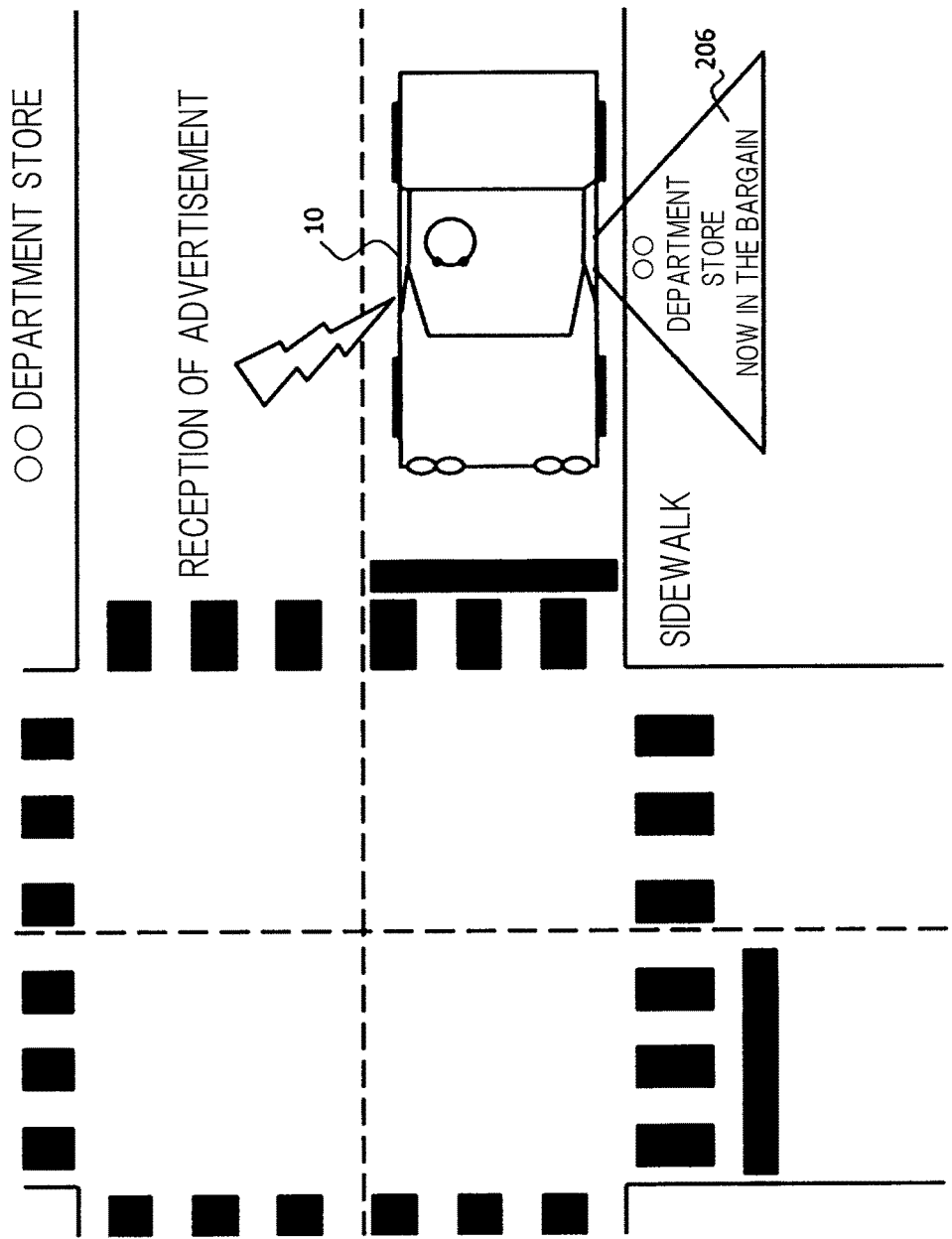
FIG. 14 is a diagram illustrating a specific example of various images projected from a projector onto the road surface based on a relationship with vehicle information.

In addition, particularly when the advertisement is displayed as the message 206, for example, it is also possible to receive the advertisement from an advertiser such as a department store close to the vehicle 10 by WiFi by using a configuration illustrated in FIG. 13(B) and display the advertisement contents as the message 206 on the road surface or the like as illustrated in FIG. 14.

Figure 15:
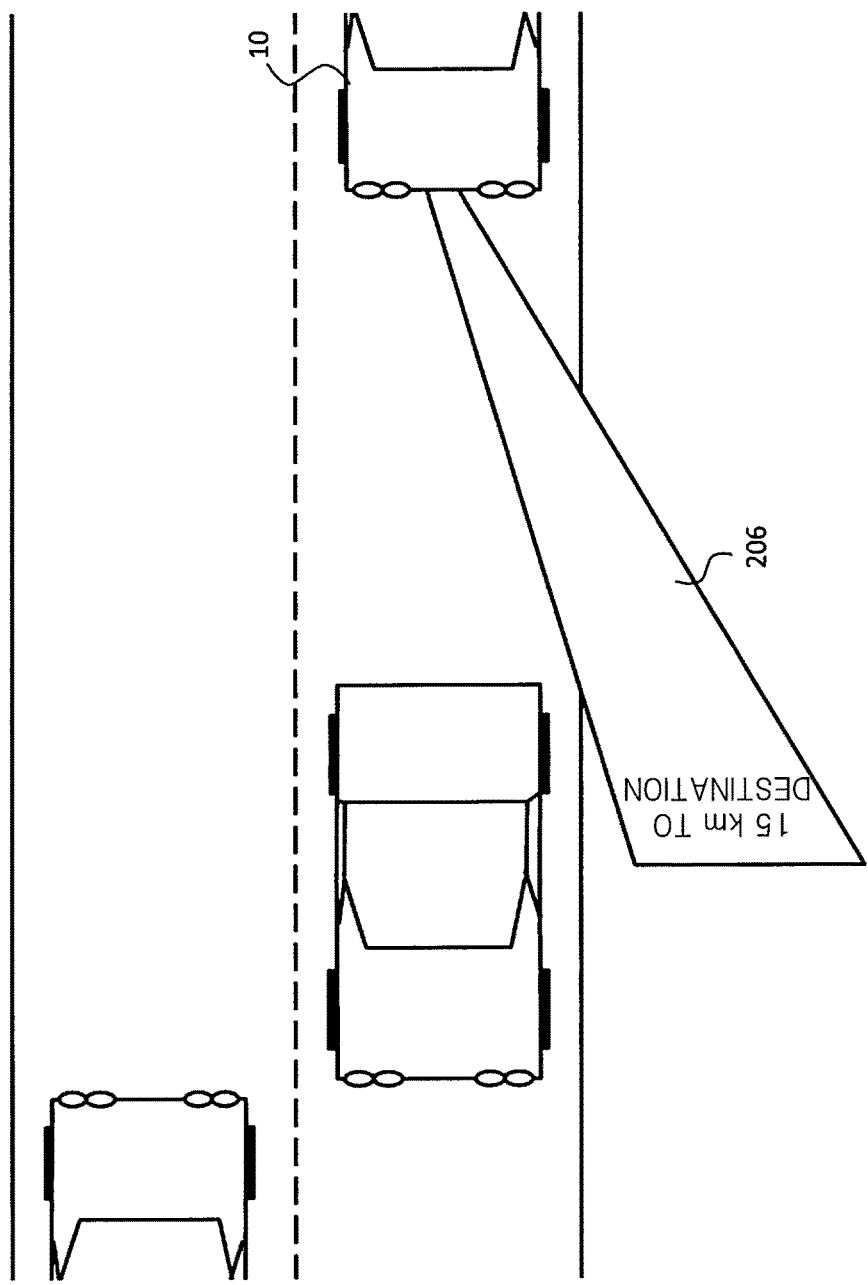
FIG. 15 is a diagram illustrating a specific example of various images projected from a projector onto the road surface based on a relationship with vehicle information.
Figure 16:
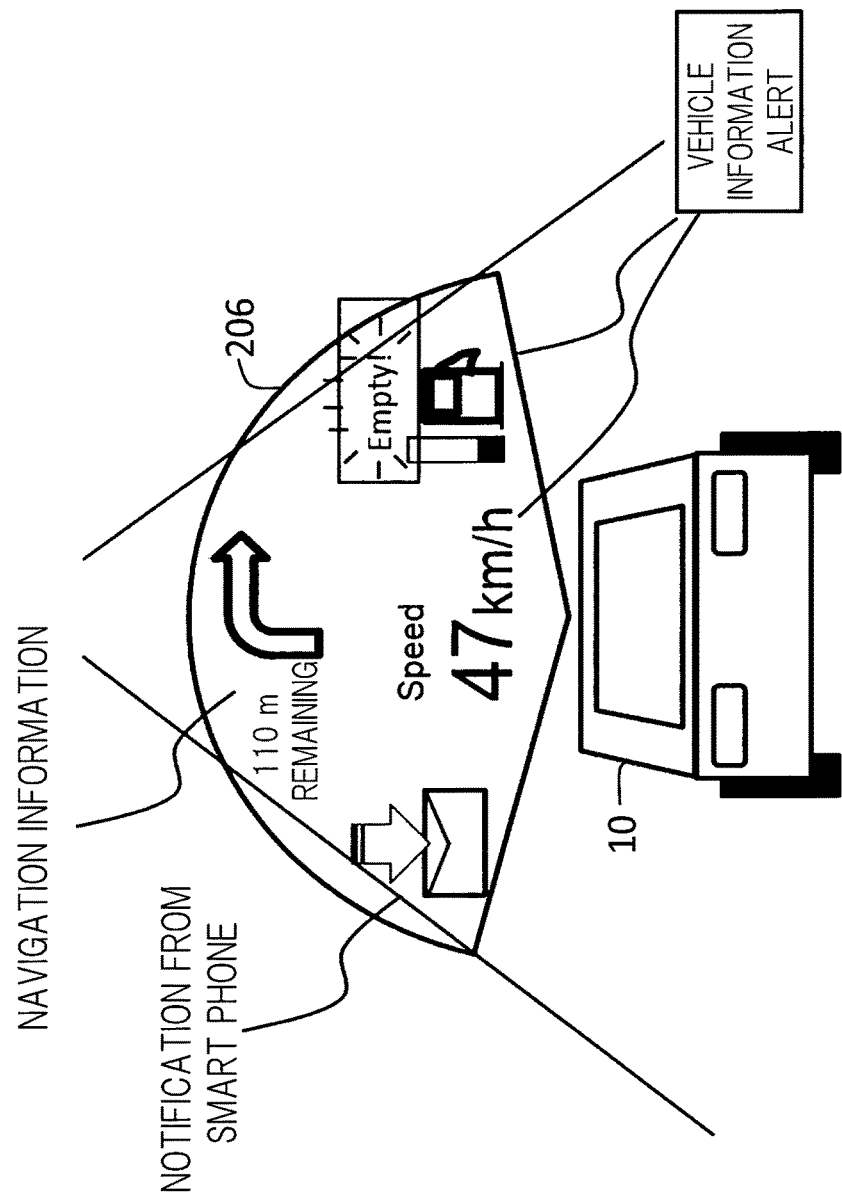
FIG. 16 is a diagram illustrating a specific example of various images projected from a projector onto the road surface based on a relationship with vehicle information.

Further, as illustrated in FIG. 15, instead of the advertisement or the like described above, information desired by the driver of the vehicle 10, for example, "15 km to the destination" (so-called navigation information) may be displayed as the message 206 on a sidewalk, side strip, road surface, or the like by using the navigation information from the communication unit of FIG. 3. By the display onto the road surface or the like including the sidewalk and side strip, it is possible to prevent false recognition by the driver of the vehicle other than the vehicle 10.

Also, regarding the information that the driver wants to know described above, as illustrated in FIG. 16, so-called navigation information (traveling direction or distance to the destination of the vehicle 10), vehicle information and alert such as traveling speed and a remaining amount of fuel of the vehicle 10, and further information related to a mobile terminal such as a smart phone owned by the driver including reception of mail may be displayed at the same time as the message 206 to be displayed.

Figure 17:
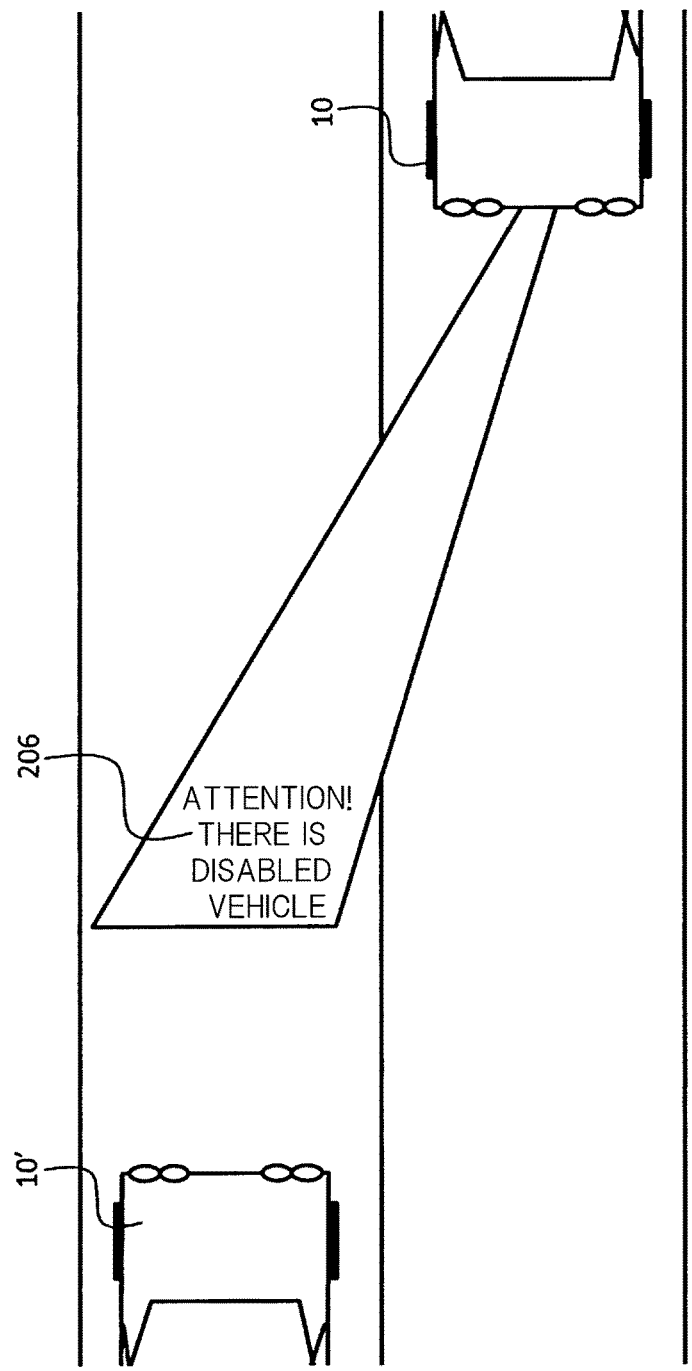
FIG. 17 is a diagram illustrating a specific example of various images projected from a projector onto the road surface based on a relationship with vehicle information.

In addition, as illustrated in FIG. 17, for example, attention information such as "Attention! There is a disabled vehicle" may be displayed as the message 206. At that time, as also illustrated in FIG. 17, since the information is attention information to the driver of the oncoming other vehicle 10', the message 206 is preferably displayed ahead of the other vehicle 10' on the opposite lane. For that purpose, it can be considered that wide-angle display of the image projection apparatus 500 may be used or the direction of the image projection apparatus 500 may be changed.

In addition, as the contents to be projected and displayed by the image projection apparatus 500 described above, the following can be further considered.

Figure 18:
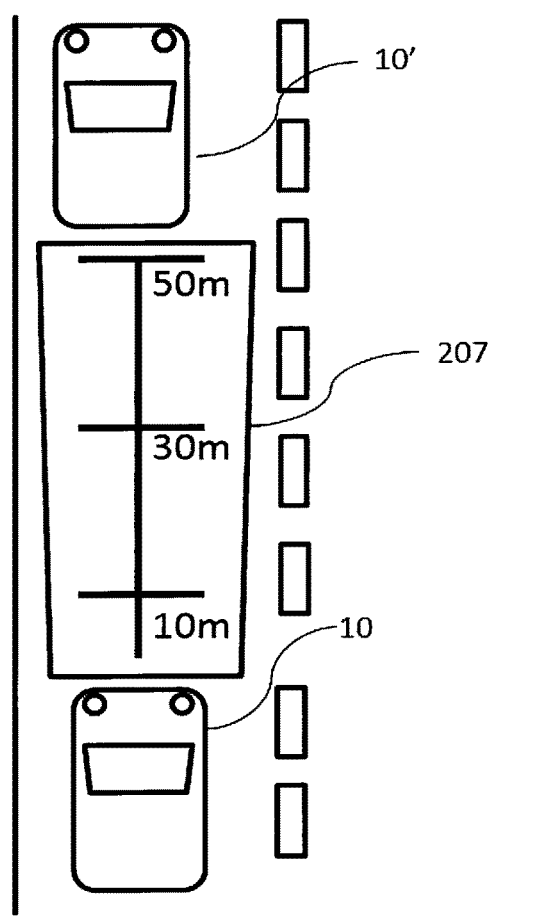
FIG. 18 is a diagram illustrating a specific example of various images projected from a projector onto the road surface based on a relationship with vehicle information.

The driver visually performs various measurements during driving, and as an example of display for assisting such measurements, FIG. 18 illustrates a ruler (measure) displayed as a projection image 207 ahead of the vehicle 10. Namely, in this example, since the driver of the vehicle 10 can easily measure a distance to the other vehicle 10' traveling in front of the vehicle 10 (inter-vehicle distance) with the ruler (measure) 207 displayed ahead of the vehicle 10, the ruler (measure) 207 contributes to safe driving.

Figure 19:
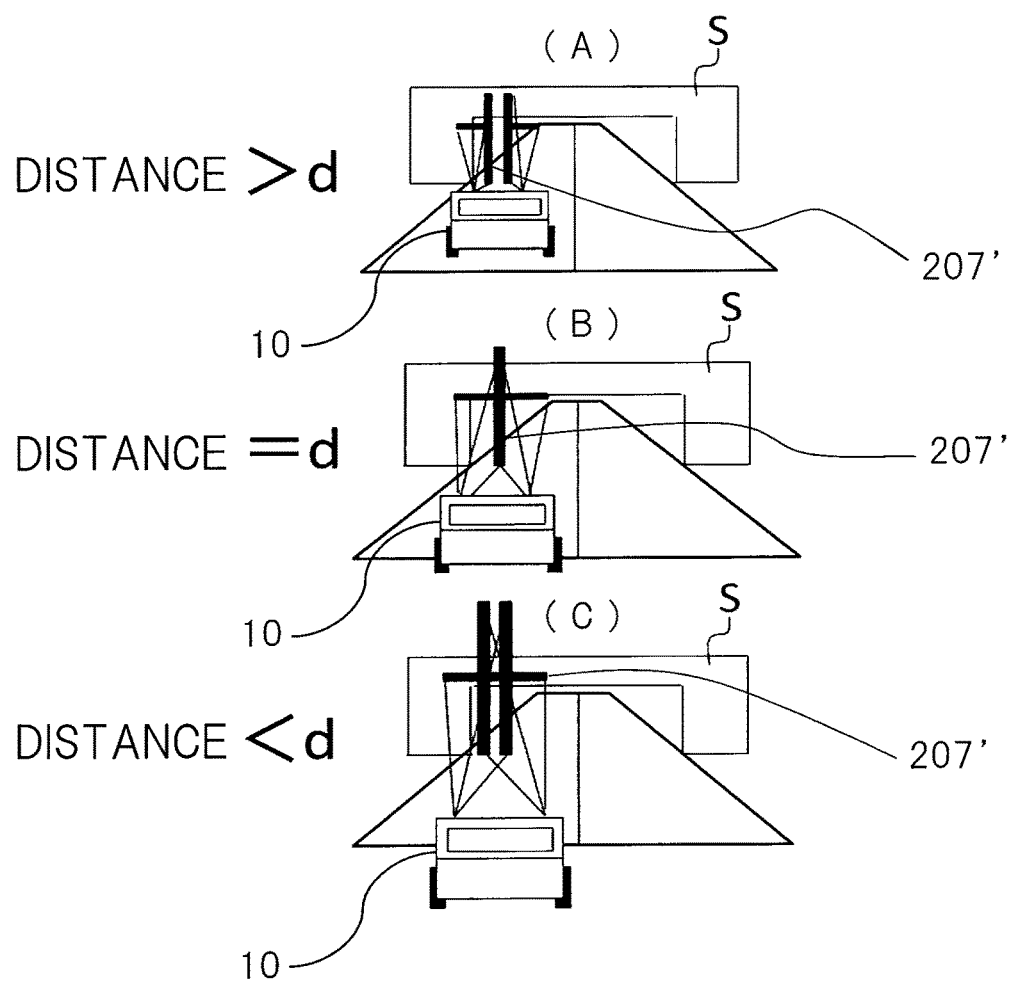
FIG. 19 is a diagram illustrating a specific example of various images projected from a projector onto the road surface based on a relationship with vehicle information.

Further, FIG. 19 illustrates a display image 207' that makes it possible to easily measure height of a building having a height limit such as a bridge or a tunnel (bridge shaped object S) when the vehicle passes under the building. Note that FIG. 19 illustrates a state where the vehicle 10 traveling toward the object S is viewed from behind.

In the display for the height measurement, from each of the image projection apparatuses 500 provided in the headlights provided on both sides (left and right) on the front of the vehicle 10 (see FIG. 1(A)), an approximately T-shaped bar image 207' formed by combination of a vertical bar and a horizontal bar is projected toward the upper side of the road surface in a traveling direction. Note that a pair of the bar images 207' is set such that backs of the vertical bars are separated from each other at a distance farther than a predetermined distance set in advance (distance>d) and the horizontal bars have a predetermined height (for example, a height at which the vehicle 10 can safely pass) at the predetermined distance (d).

As a result, when the vehicle 10 is at the distance farther than the predetermined distance set in advance (distance>d), the pair of bar images 207' is displayed to be separated from each other as illustrated in FIG. 19(A). Thereafter, when the vehicle 10 is at the predetermined distance set in advance (distance=d), the pair of T-shaped bar images 207' is combined to form a cross shape as illustrated in FIG. 19(B). The horizontal bars of the "T"-shaped bar images 207' at this time indicate the height at which the vehicle 10 can safely pass, and the driver can know whether or not the vehicle can safely pass by confirming the position of the horizontal bars of the bar images 207' in the cross shape. After that, the pair of the T-shaped bar images 207' is displayed to overlap with each other as illustrated in FIG. 19(C).

Figure 20:
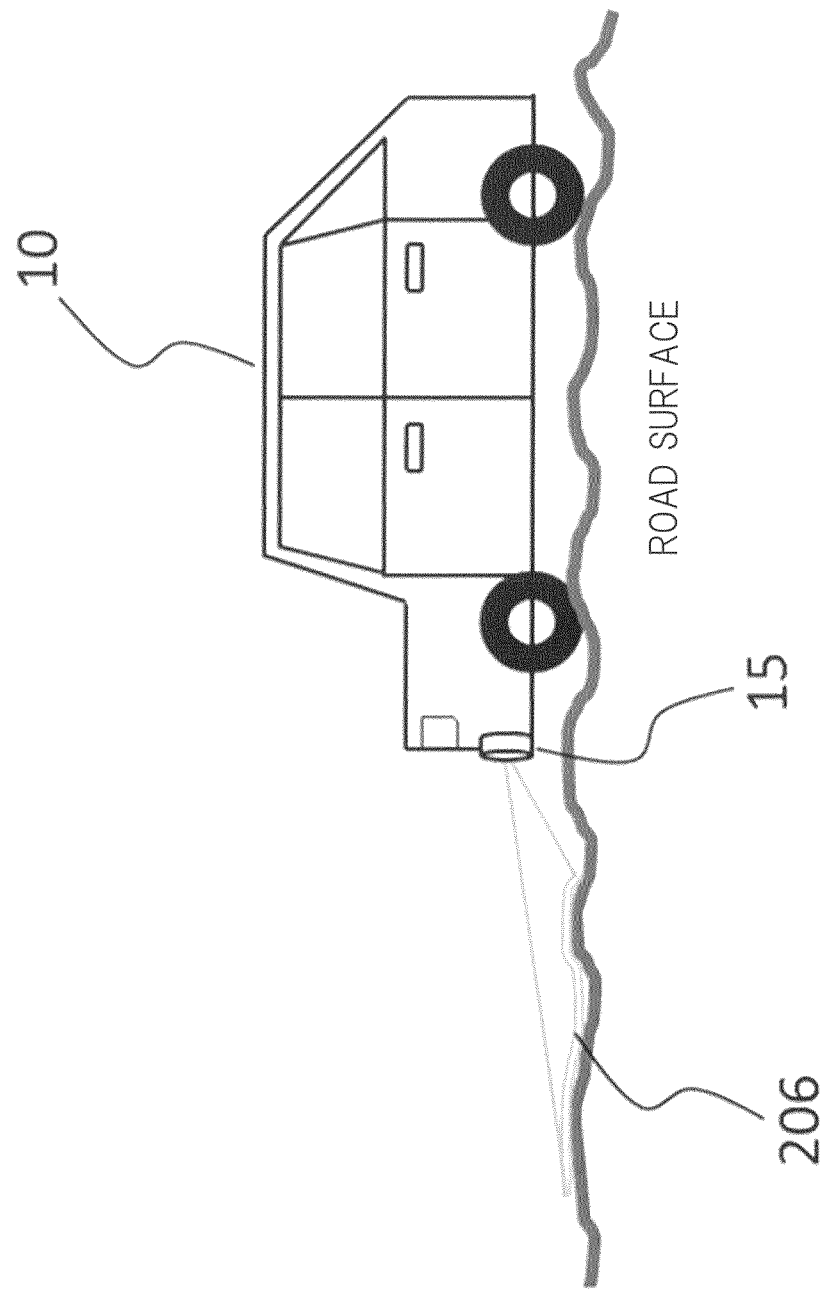
FIG. 20 is a diagram illustrating a specific example of various images projected from a projector onto the road surface based on a relationship with vehicle information.

Note that it can be considered that the road surface or the like on which the vehicle 10 displays various types of information as an image may be a road surface or the like that is unpaved and has unevenness on the surface as illustrated in FIG. 20. In that case, as also illustrated in FIG. 20, a road surface sensor 15 such as a camera (for example, an infrared stereo camera) is attached in front of the vehicle 10 (traveling direction), a state of the road surface or the like (shape, reflectance, and the like) is obtained from an image plane imaged by the camera, and the image to be projected on the road surface or the like is corrected based on the result. In this manner, it is possible to display an image which is corrected based on the shape and reflectance of the road surface and is excellent in visibility and easily recognizable.

Figure 21:
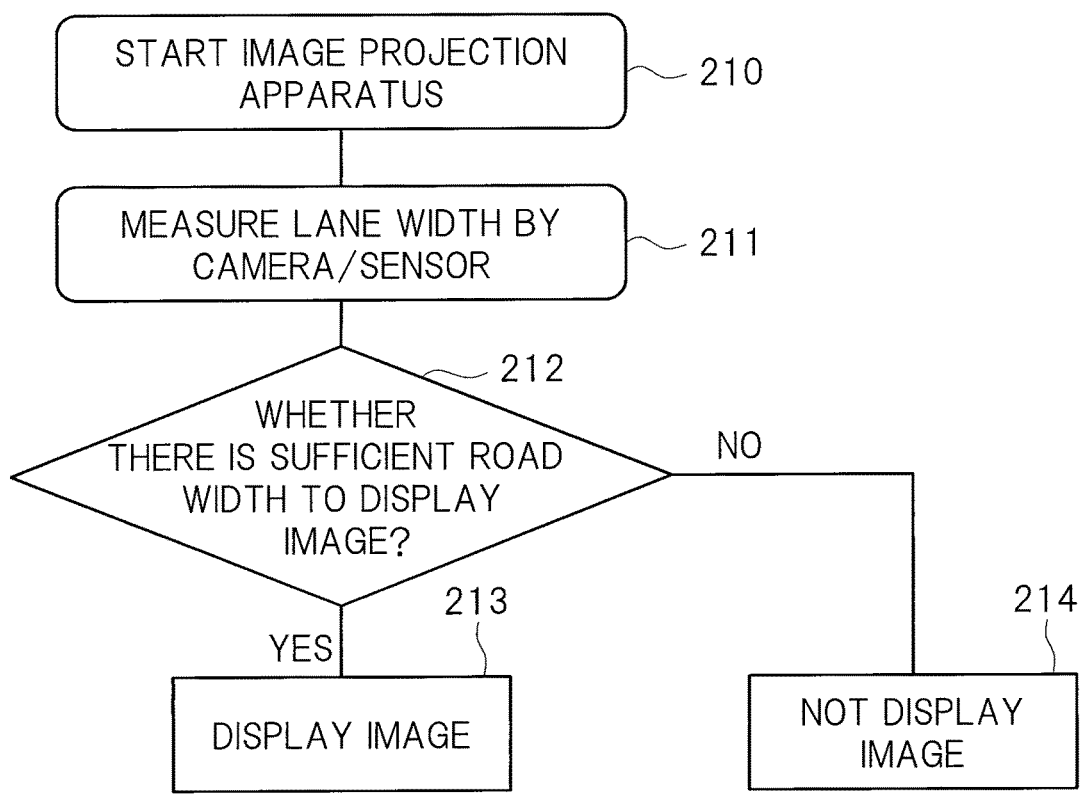
FIG. 21 is a diagram illustrating a specific example of various images projected from a projector onto the road surface based on a relationship with vehicle information.

In addition, by using the road surface sensor 15 such as the camera described above, the ECU 40 described above can determine whether the image is displayed or not displayed in accordance with a flow illustrated in FIG. 21. In the example of FIG. 21, the image projection apparatus 500 is started (step 210), left and right lane lines of the vehicle 10 are read from the image of the camera to measure a lane width and detect a road width (step 211), whether or not there is a sufficient road width to display the image is determined (step 212), the image is displayed in a case where it is determined that there is the sufficient road width to display the image in step 212 (step 213), and the image is not displayed in a case where it is determined that there is not the sufficient road width to display the image in step 212 (step 214).

Figure 22:
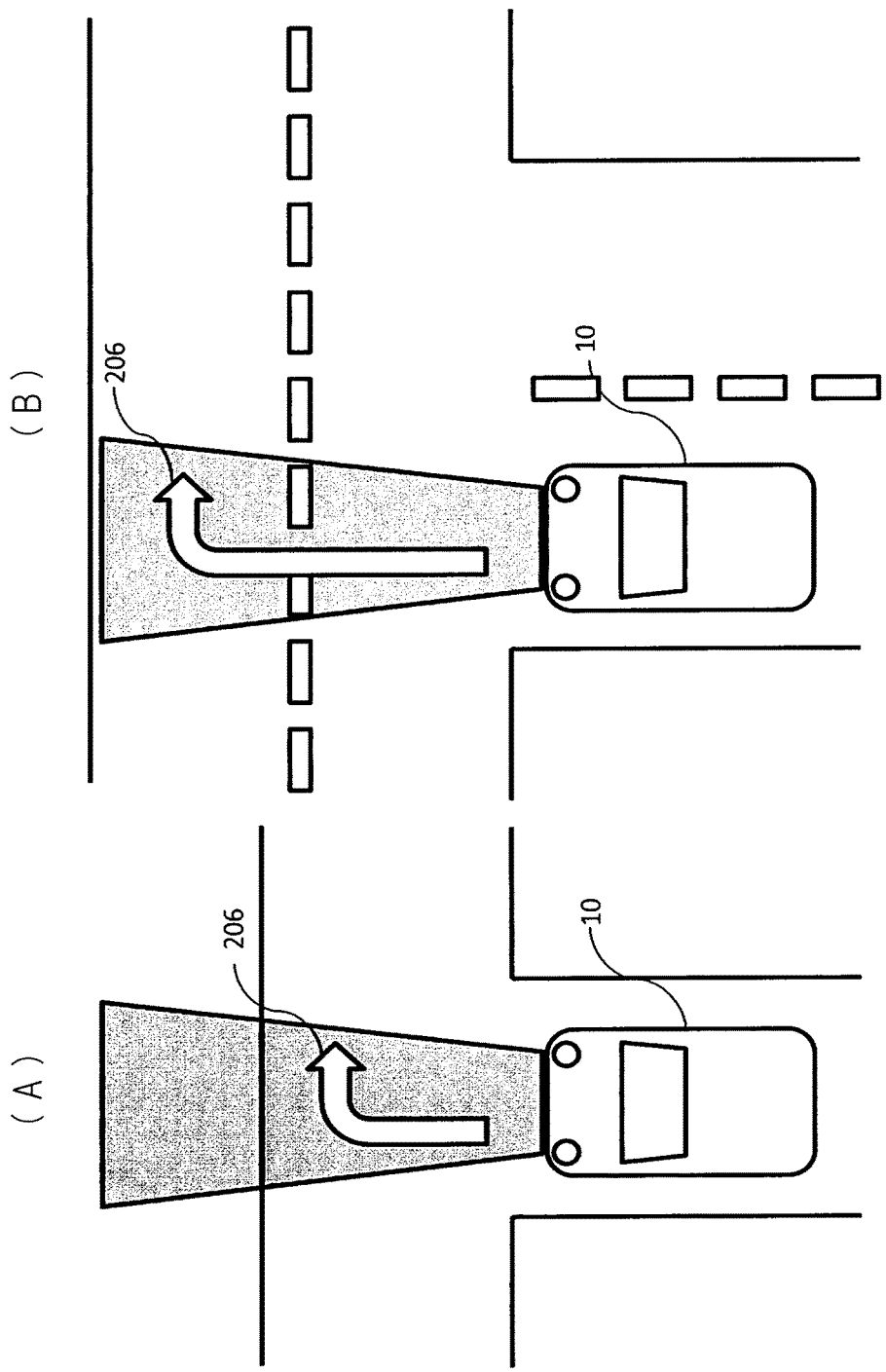
FIG. 22 is a diagram illustrating a specific example of various images projected from a projector onto the road surface based on a relationship with vehicle information.

Alternatively, by using the road surface sensor 15 such as the camera described above, as illustrated in FIG. 22, a distance to the image 206 to be projected is set small in a narrow alley or the like (see FIG. 22(A)), and the distance to the image 206 to be projected is set large in a wide road (see FIG. 22(B)). In this manner, an image with excellent visibility can be displayed. Note that a hatching portion of the figure indicates a projection region of the image projection apparatus 500.

Figure 23:
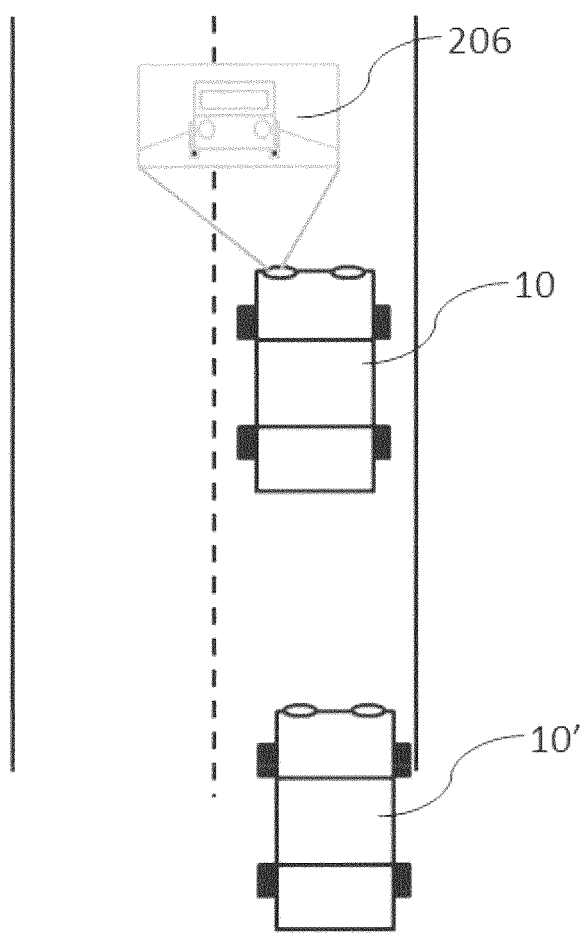
FIG. 23 is a diagram illustrating a specific example of various images projected from a projector onto the road surface based on a relationship with vehicle information.

Further, as also illustrated in FIG. 23, by attaching the camera described above to the rear of the vehicle 10, the image of the other vehicle 10' behind the vehicle 10 obtained by the camera can be displayed and projected ahead of the vehicle 10. This will be convenient for the driver because it is possible to easily confirm the situation behind the vehicle 10 without looking backward when stopped or the like.

Figure 24:
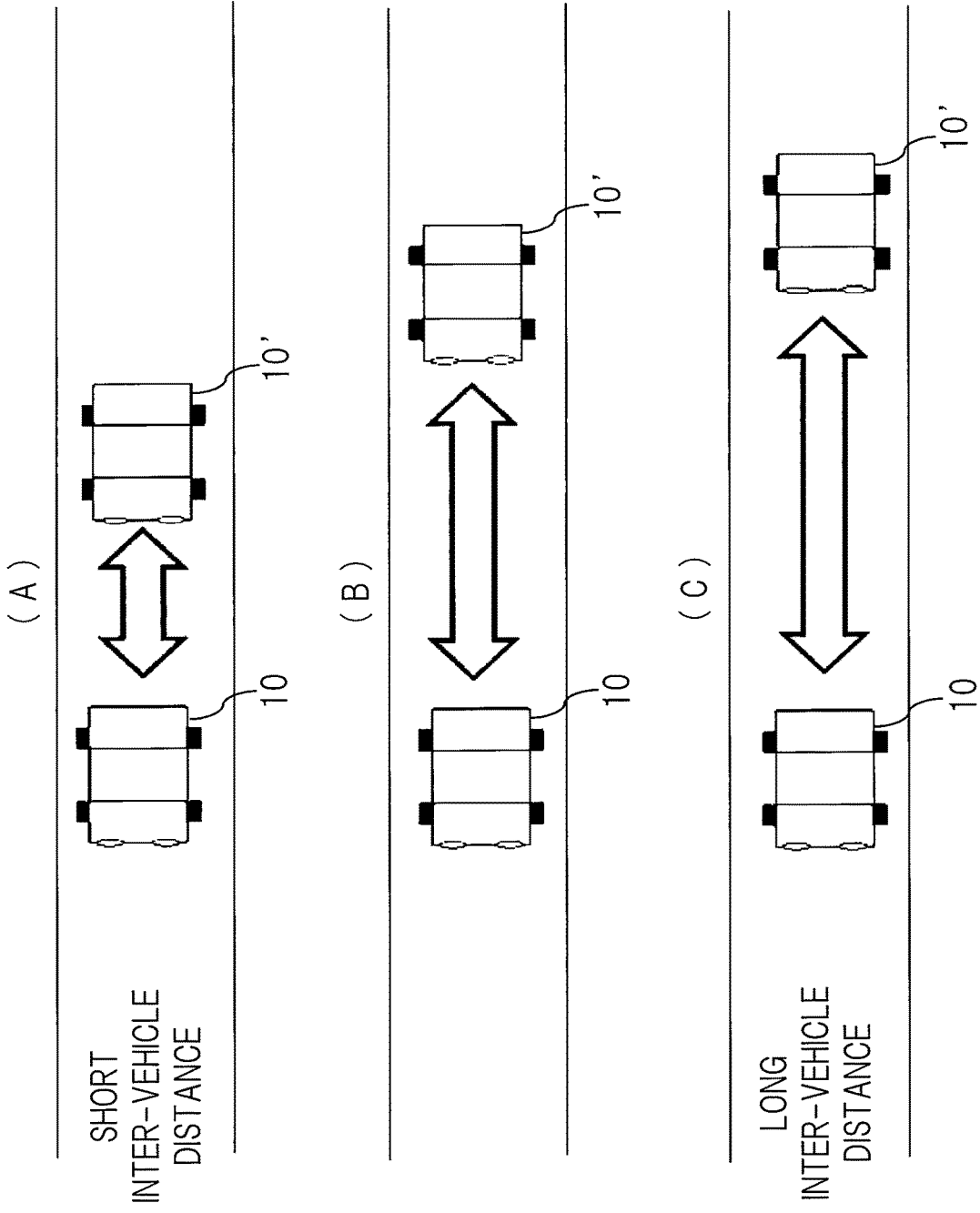
FIG. 24 is a diagram illustrating a specific example of various images projected from a projector onto the road surface based on a relationship with vehicle information.

In addition, as also illustrated in FIG. 24, based on the image of the following other vehicle 10' obtained by the camera attached to the rear of the vehicle 10, the ECU 40 can display warning to the following vehicle in accordance with a distance to the following other vehicle, traveling speed, and a threshold. Namely, in a case where it is determined that the inter-vehicle distance is too short from the traveling speed, for example, a red arrow is displayed behind the vehicle 10 (see FIG. 24(A)), and in a case where it is determined that the distance is not too short but should be noted, for example, a yellow arrow is displayed (see FIG. 24(B)). Further, in a case where it is determined that the inter-vehicle distance is sufficient, no display is performed (see FIG. 24(C)).

In the various examples described above, cases where image light from the image projection apparatus 500 is projected on the road surface or the like around the vehicle 10 have been described. However, the present invention is not limited thereto, and it is also possible to perform highlighting to some objects in the projection region of the image projection apparatus 500.

As an example, as illustrated in FIG. 25, based on an image signal from a road surface sensor such as the camera attached to the front of the vehicle 10, the ECU 40 detects an obstacle (in this example, a tree) in the traveling direction (see FIGS. 25(A) and 25(B)). Then, when the image light is projected by the image projection apparatus 500, the obstacle is selectively displayed by performing highlighting such as blinking only to a portion of the obstacle (in this example, a stem of the tree), thereby arousing attention to the driver (see FIG. 25(C)). Note that, in FIG. 25(B), a display range in a vertical direction in the vicinity of the tree by the image light 206 projected from the image projection apparatus 500 is indicated by light hatching, and in FIG. 25(C), a region in which blinking is turned ON is indicated by dark hatching. Note that, when the ECU 40 determines that an object is not the obstacle, blinking is turned OFF (see FIG. 25(D)).

Figure 26:
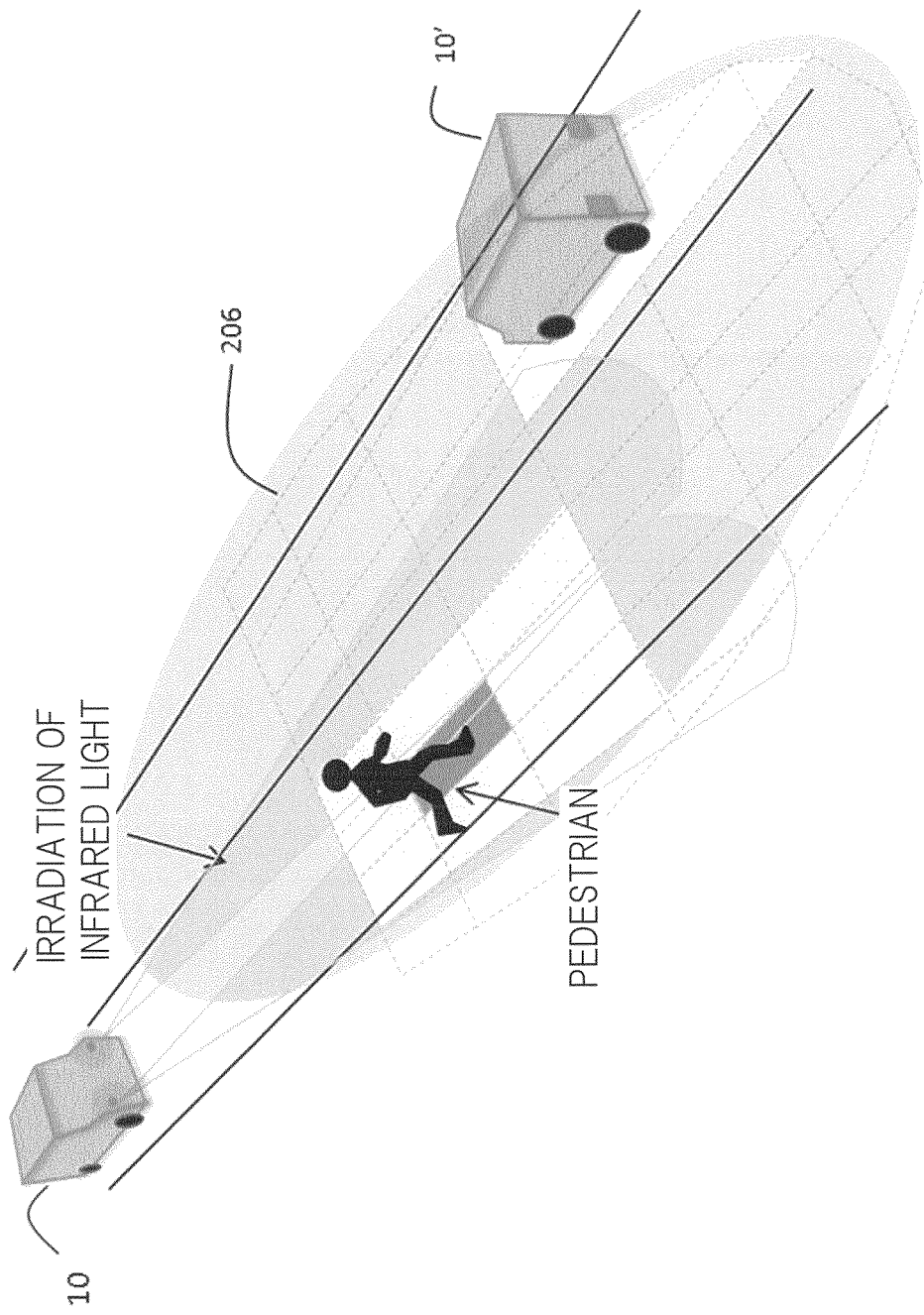
FIG. 26 is a diagram illustrating a specific example of various images projected from a projector onto the road surface based on a relationship with vehicle information.

Further, as illustrated in FIG. 26, the vehicle 10 can perform highlighting for the pedestrian or the oncoming vehicle 10' detected by irradiation of infrared light by changing the display color (for example, red) of only a corresponding portion of a region of the image light 206 in a pinpoint manner. As a method for the highlighting, besides the above, brightness of image light to be projected on and/or around the obstacle may be modulated or the image light may be blinked. Also, an animation or the like may be used. Note that the display position of the obstacle highlighting described above performed to the object (for example, a tree) does not move even when the vehicle 10 moves. Further, similar display may be performed not only for the obstacle but also for dangerous objects such as a manhole lid and a wheel stop.

In the foregoing, the display of various types of information by the image projection apparatus 500 (see FIG. 5) has been described as being performed as necessary. However, regarding information or the like displayed ahead of and behind the vehicle 10 in particular, effective display thereof cannot be performed when an inter-vehicle distance to the front vehicle or the rear vehicle is not sufficient. Therefore, although not illustrated here, the display of the projection image may be performed only when the sufficient inter-vehicle distance is maintained as a result of the detection by the use of the camera or the sensor described above, and the display may be stopped when the inter-vehicle distance is shorter than a predetermined distance.

Further, details for displaying an image which is corrected based on the shape and reflectance of the road surface and is excellent in visibility and easily recognizable in relation to FIG. 20 described above will be described below.

First, for distortion (unevenness) of a road surface shape, for example, as also illustrated in FIGS. 27(A) and 27(B), an image 201 in which a lattice pattern is inserted in a projection image 200 is projected on the road surface by the image projection apparatus attached to the front of the vehicle 10. Then, if distortion of the road surface is detected by capturing the image ahead of the vehicle by the camera 61 attached to the vehicle 10 and performing predetermined image processing to the image by the ECU 40 described above, and the projection image is corrected in accordance with the detected distortion of the road surface, an image that has no distortion and is excellent in visibility and easily recognizable can be obtained regardless of the distortion of the road surface. However, since a predetermined time is required for that purpose, it is difficult to perform such processing in real time.

Figure 28:
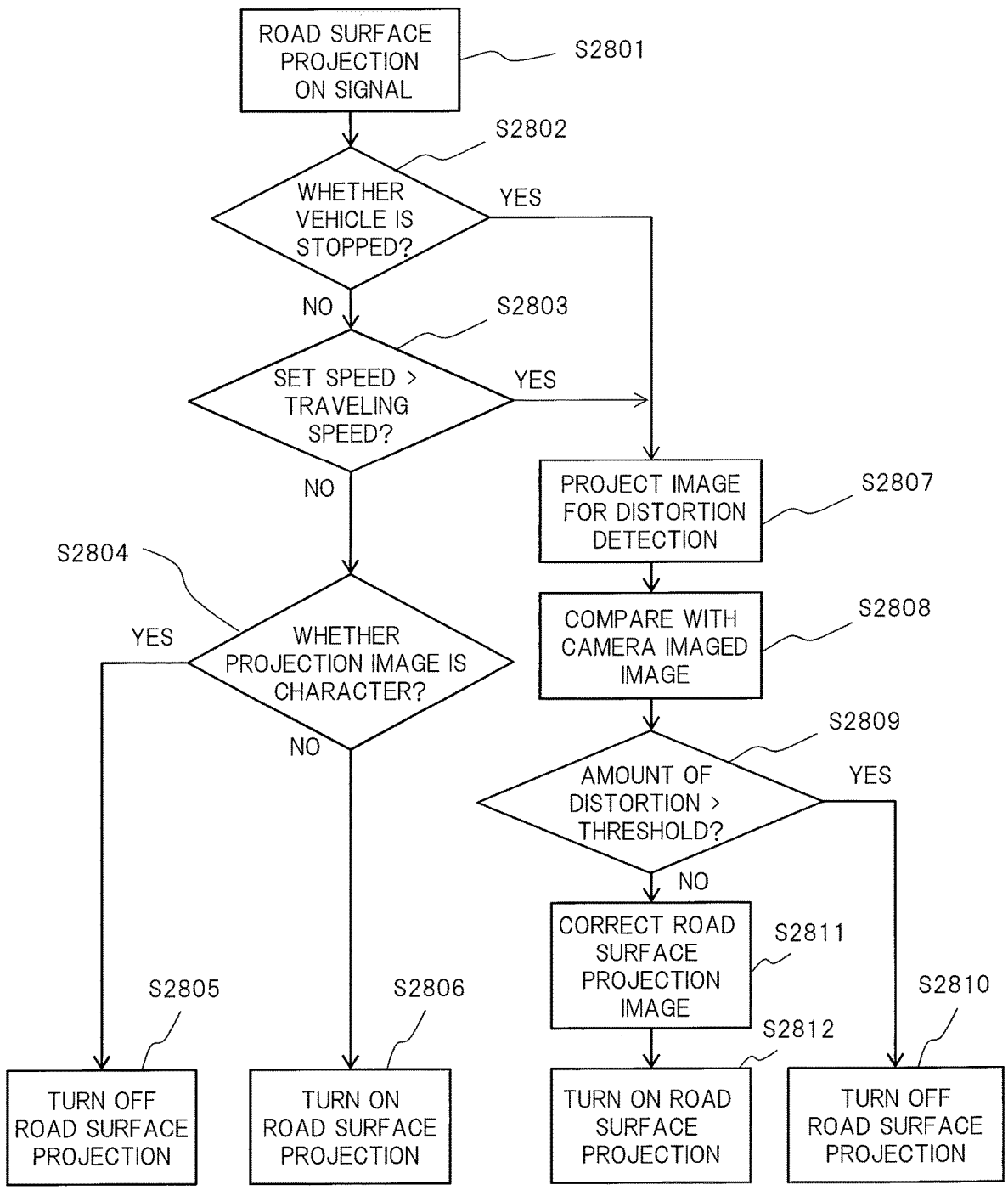
FIG. 28 is a diagram illustrating a further specific example of various images projected from a projector onto the road surface based on a relationship with vehicle information.

Therefore, as also illustrated in a flowchart of FIG. 28, ON and OFF of the distortion correction processing described above are switched as appropriate in accordance with the traveling speed of the vehicle. At that time, a type of the image to be projected is also included in the switching condition. This is because since the attention of the driver is directed to interpretation when the display information is characters, the display thereof is not considered preferable for safe driving.

Specifically, as also illustrated in the figure, when a road surface projection ON signal is received (S2801), it is determined whether or not the vehicle is stopped (S2802). As a result, when the vehicle is stopped ("YES"), the distortion correction processing described above is performed (details thereof will be described below). On the other hand, when the vehicle is not stopped ("NO"), it is further determined whether or not the traveling speed of the vehicle is lower than a set speed (S2803). As a result, when the traveling speed of the vehicle is lower than the set speed ("YES"), the distortion correction processing described above is performed. On the other hand, when the traveling speed of the vehicle is higher than the set speed ("NO"), it is determined whether or not the projection image is characters (or whether or not characters are included) (S2804). As a result, when the projection image is characters ("YES"), the road surface projection ON signal is switched to OFF (S2805). When the projection image is not characters ("NO"), switching of the road surface projection ON signal is not performed (S2806).

In the distortion correction processing executed when the vehicle is stopped ("YES") in the determination (S2802) and when the traveling speed is lower than the set speed ("YES") in the determination (S2802), the image 201 serving as an image for distortion detection in which the lattice pattern is inserted in the projection image 200 described above is first projected (S2807). Thereafter, imaging is performed by the camera described above, and the lattice pattern inserted in the projection image 200 and a lattice pattern in a screen imaged by the camera are compared with each other (S2808). Then, when it is determined that the distortion of the lattice pattern in the camera imaging screen is larger than a predetermined value (threshold) ("YES") (that is, the distortion is too large to be corrected) by the determination (S2809), the road surface projection ON signal is switched to OFF (S2810), that is, road surface projection is stopped. On the other hand, when it is determined that the distortion is smaller than the predetermined value (threshold) ("NO"), correction is performed to a road surface projection image (S2811), and the road surface projection is performed without switching of the road surface projection ON signal (S2812). Note that the processing described above may be executed by, for example, the CPU (Central Processing Unit) 41 of the light control ECU 40 illustrated also in FIG. 4.

As apparent from the above, in the above embodiment, basically, the image is projected only at a speed at which safe driving can be secured with the inclusion of being stopped, and the display of the image is inhibited particularly when characters are included in the projection image. Also, in a case where the distortion on the road surface on which the image is projected is too large (amount of distortion>threshold), projection of the image onto the road surface is stopped. In this case, the display of the image is purposely stopped because image distortion in a target person (observer) having a different viewing location also becomes larger in the corrected image when the amount of distortion is large.

Also, brightness and color of the projection image may be made different from the intended ones in some cases due to color of the road surface or a pattern such as a crosswalk. In such a case, there is a possibility that intention of the driver who is projecting the image on the road cannot be correctly transmitted to the surroundings. Thus, in an embodiment also described in detail later, by detecting distribution of nonuniformity (so-called irregularity) of color and illuminance of the projection image on the road surface, brightness correction and color balance correction are performed at each location on the road surface on which the image is projected, so that an image that is excellent in visibility and is easily recognizable is obtained and the image intended by the driver can be projected on the road surface.

Figure 27:
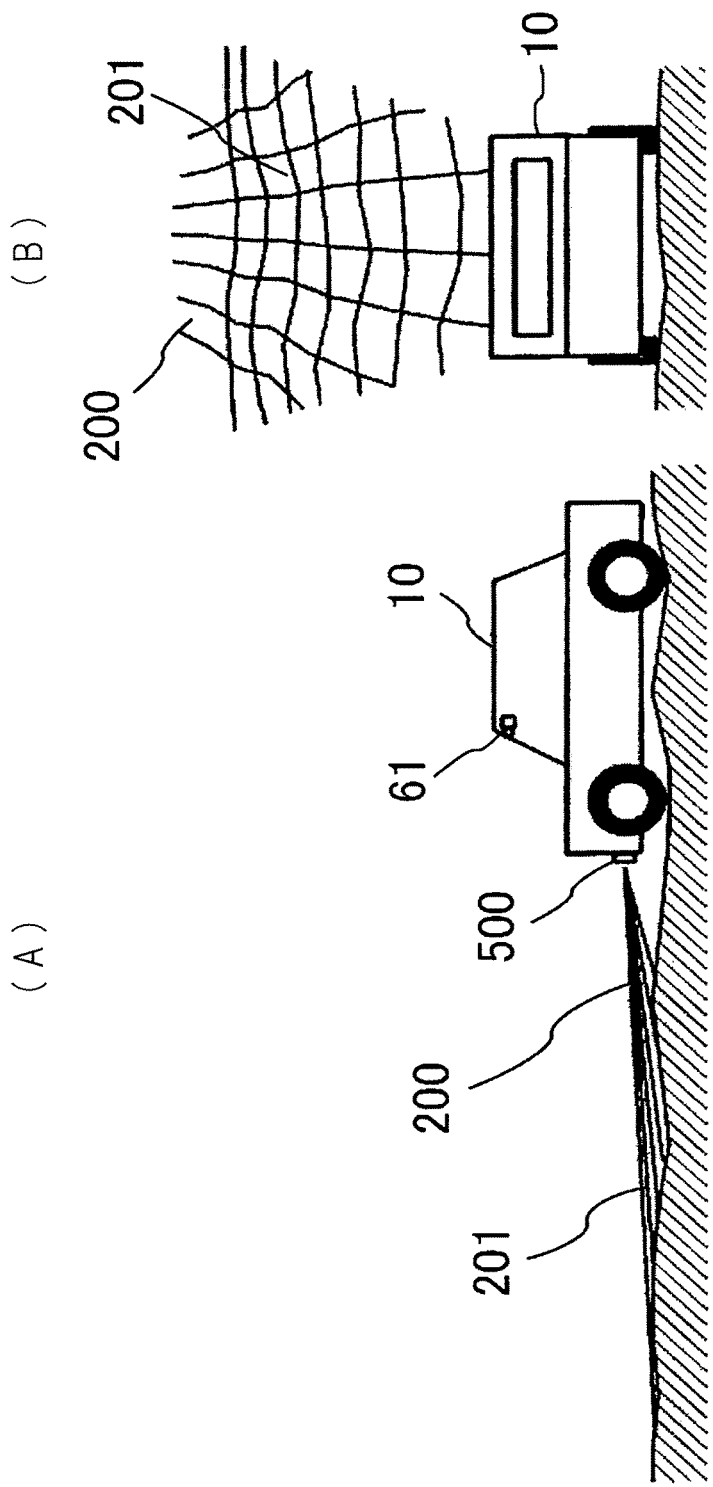
FIG. 27 is a diagram illustrating a further specific example of various images projected from a projector onto the road surface based on a relationship with vehicle information.
Figure 29:
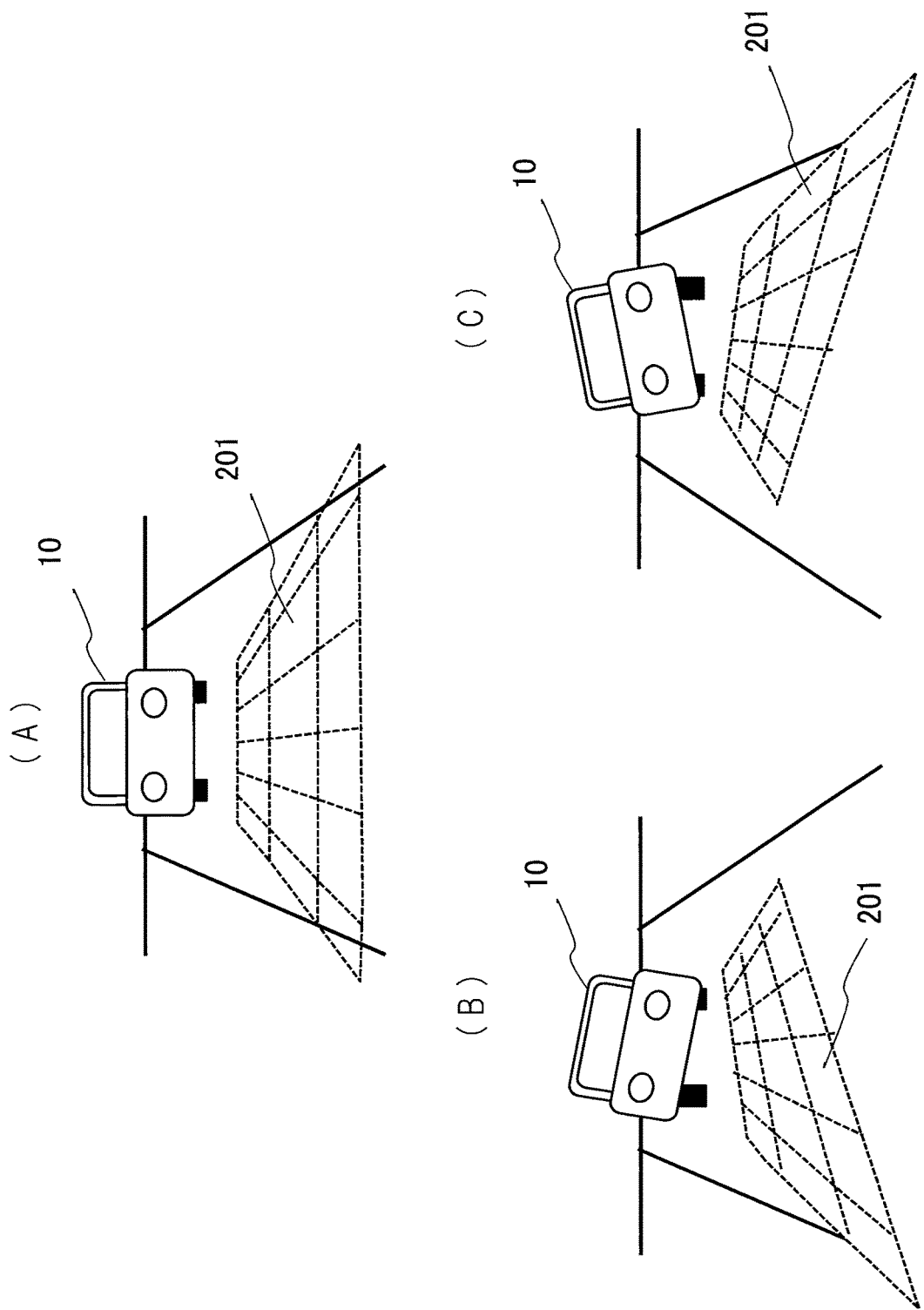
FIG. 29 is a diagram illustrating a further specific example of various images projected from a projector onto the road surface based on a relationship with vehicle information.

Regarding the distortion (unevenness) of the road surface shape described above, specifically, in addition to the image for distortion detection illustrated in FIG. 27, that is, the image 201 (see FIG. 29(A)) which is projected on the road surface from the image projection apparatus attached to the front of the vehicle 10 and has the lattice pattern inserted therein, an image of full white display (image containing color light of R, G, and B) may be projected on the road surface although not illustrated here. Note that the image of full white display is intermittently projected on the road surface together with the image 201 in which the lattice pattern is inserted, and may be used for the brightness correction as will be described later.

In accordance with the above, based on the imaging screen obtained by the camera 61 described above (see FIG. 27), distribution of brightness can be detected from irregularity in illuminance on the road surface, and illuminance balance of each color can be detected from irregularity in color. Then, by performing the brightness correction and the color balance correction based on the detection results in each location on the road surface on which the image is projected, the image intended by the driver can be displayed on the road surface. In the above, the case where the image of full white display is intermittently displayed together with the image 201 in which the lattice pattern is inserted has been described, but the present invention is not limited thereto, and it would be apparent for those skilled in the art that an effect similar to the above can be obtained even when, for example, the color light of R, G, and B is sequentially inserted or intermittently inserted.

In addition, when the image projection apparatus described above is tilted with respect to the road surface serving as a projection plane of the image or displays the image by a so-called oblique projection, the size of the image is greatly changed and the projection image is distorted due to a relationship between the image projection apparatus and the road surface, that is, a relative angle (tilt angle) to the road surface. For that reason, the image projection apparatus and the road surface are preferably parallel to each other.

For example, in a case where the vehicle 10 is parallel to the road surface, as also illustrated in FIG. 29(A), the lattice pattern inserted in the projection image is displayed without distortion (original shape). Meanwhile, as also illustrated in FIG. 29(B), in a case where the vehicle 10 is tilted with respect to the road surface, in particular, tilted to the left side in the horizontal direction with respect to the traveling direction, the image projected from the image projection apparatus and displayed on the road surface is deformed from its original shape and distorted. Also, in a case where the vehicle 10 is tilted to the right side, as illustrated in FIG. 29(C), the image is distorted similarly. Note that the lattice pattern has been described as the image inserted in the projection image, but it goes without saying that the distortion of the road surface can be similarly detected by using a rectangular image or a simple rectangular frame instead of the lattice pattern.

Further, as also illustrated in FIG. 30, the vehicle 10 is normally required to be positioned in parallel to the road surface in the traveling direction (see FIG. 30(A)). However, for example, the vehicle may be tilted forward (see FIG. 30(B)) or may be tilted backward (see FIG. 30(C)). Also when the vehicle body is tilted forward or backward in this way, the image projected from the image projection apparatus and displayed on the road surface is reduced backward or enlarged forward from the original shape (rectangle), and distorted by deformation after all.

Thus, for example, if the rectangular or lattice image pattern described above is inserted and the image projected on the road surface is imaged by the camera 61 described above (see FIG. 27) to perform predetermined image processing thereto before the image display such as at the start of the vehicle, tilt (tilt in the traveling direction and the horizontal direction) of the image projection apparatus and further that of the vehicle with respect to the road surface can be detected. If the tilt between the image projection apparatus and the road surface is corrected based on the tilts with respect to the road surface detected in this way (tilts in the traveling direction and the horizontal direction), an image that has no distortion and is excellent in visibility and easily recognizable can be obtained. The tilt with respect to the road surface detected in this way (tilt in the traveling direction and the horizontal direction) can be used also for the attitude control of the vehicle body by an actuator installed in the vehicle similarly to an auto-leveling function of the headlight.

Also, FIG. 21 above illustrates a flow of the determination as to whether the image is displayed or not displayed, executed by the ECU 40 by the use of a road surface sensor such as the camera. There, an example in which it is determined whether or not there is the sufficient road width to display the image, and the image is displayed in a case where it is determined that there is the sufficient road width to display the image, whereas the image is not displayed in a case where it is determined that there is not the sufficient road width to display the image has been described. However, the present invention is not limited thereto, and display as described below is also possible.

Figure 31:
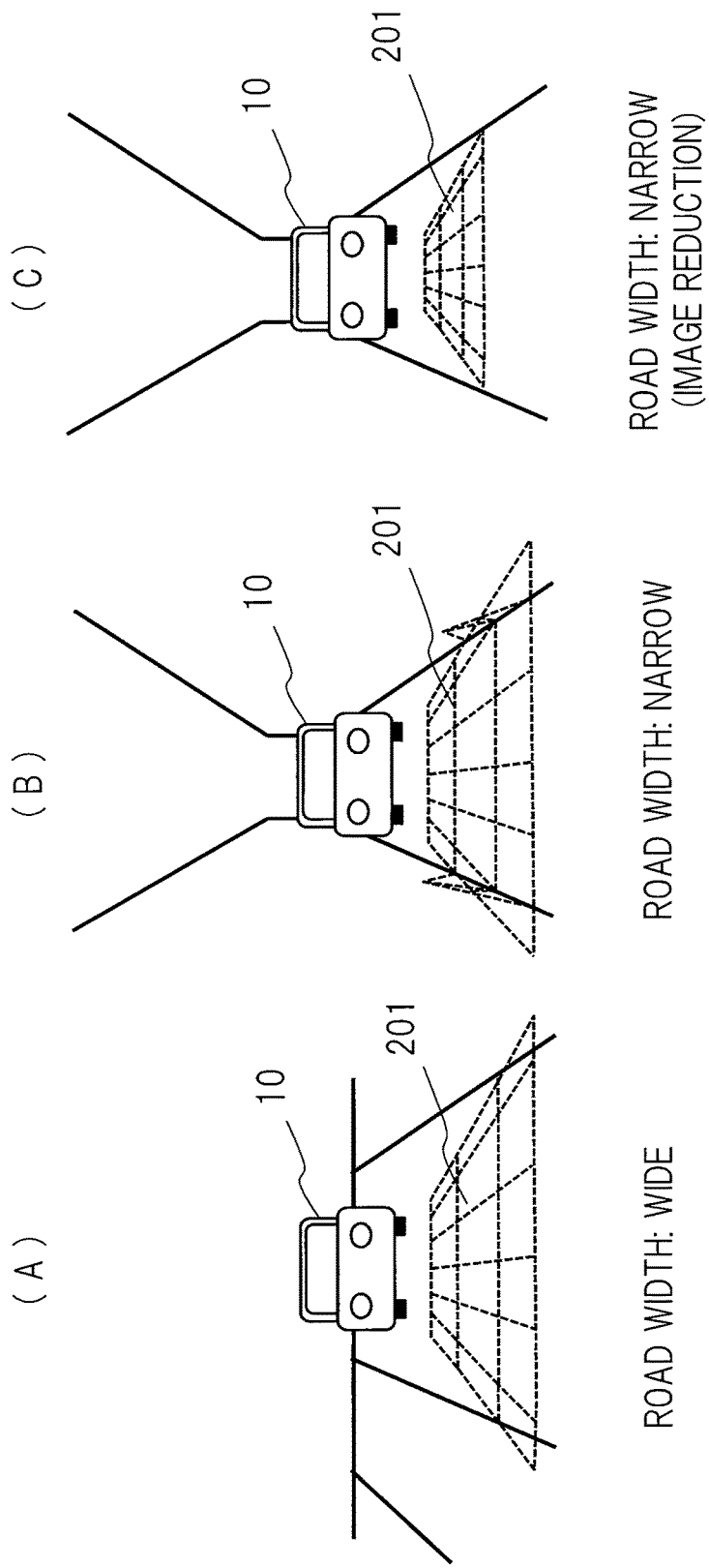
FIG. 31 is a diagram illustrating a further specific example of various images projected from a projector onto the road surface based on a relationship with vehicle information.

More specifically, for example, in a location where the road width is sufficiently wide as also illustrated in FIG. 31(A), by projecting the image 201 in which the lattice pattern is inserted and comparing an actual image with the projection image by the use of the camera before the desired image is projected on the road, existence of the obstacle and walls in left and right front of the road surface can be detected. However, actually, when the detected obstacle such as the walls overlaps with the display image in relation to the size of the image to be projected as also illustrated in FIG. 31(B), the image may not be displayed, or the image to be projected may be reduced as also illustrated in FIG. 31(C).

Figure 32:
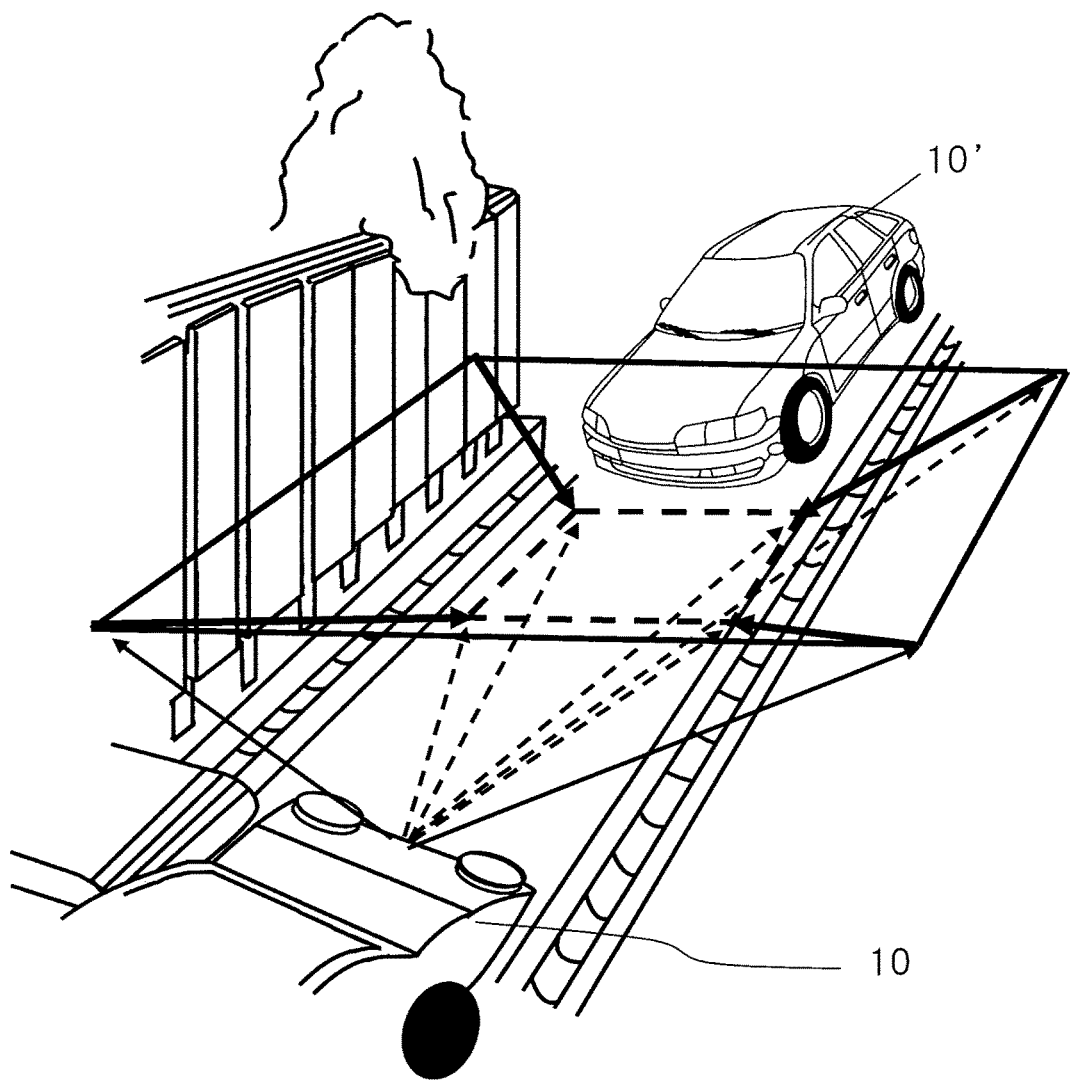
FIG. 32 is a diagram illustrating a further specific example of various images projected from a projector onto the road surface based on a relationship with vehicle information.

Further, FIG. 32 illustrates a state where the vehicle 10 meets the oncoming vehicle 10' (obstacle) in a narrow alley. In this case, as indicated by arrows in the figure, a region of the image to be projected and displayed from the image projection apparatus (see the thick line in the figure) is limited to a range that can be displayed on the road (see the dashed line in the figure), or reduced to be displayed.

Figure 33:
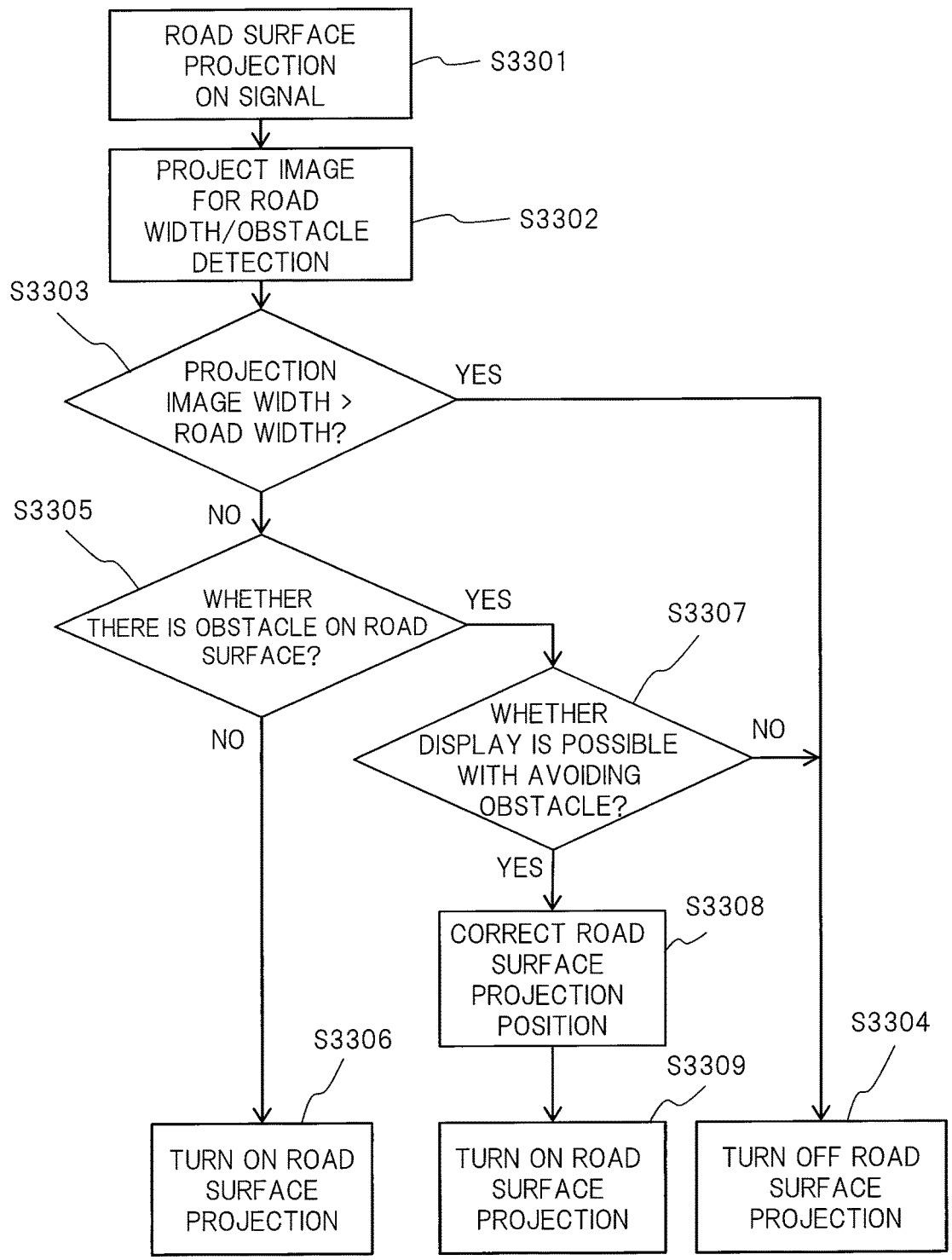
FIG. 33 is a diagram illustrating a further specific example of various images projected from a projector onto the road surface based on a relationship with vehicle information.

FIG. 33 illustrates an example of a processing flow in the case described above. First, when the road surface projection ON signal is received (S3301), a so-called road width/obstacle detection image such as the lattice pattern described above is inserted to the projection image and is projected on the road surface from the image projection apparatus (S3302). Thereafter, the image projected on the road surface is imaged by the camera, and it is determined whether or not the width of the imaged projection image is larger than the width of the road (S3303). As a result, in a case where it is determined that the width of the projection image is larger than the width of the road ("YES"), the road surface projection of the image is stopped (OFF) (S3304).

On the other hand, in a case where it is determined that the width of the projection image is smaller than the width of the road ("NO"), it is determined whether or not there is the obstacle on the road surface by using the image imaged by the camera (S3305). As a result, in a case where there is no obstacle on the road surface ("NO"), road surface projection of the image is executed (ON) (S3306). On the other hand, in a case where there is the obstacle ("YES"), it is further determined whether or not the image display can be performed with avoiding the obstacle (S3307). Then, in a case where the image can be displayed with avoiding the obstacle ("YES"), a projection position on the road surface is corrected (S3308), and then the road surface projection is executed (ON) (S3309). Note that the processing described above may be performed by, for example, the CPU (Central Processing Unit) 41 of the light control ECU 40 also illustrated in FIG. 4 above.

In addition, in FIG. 24 above, displaying warning to the following vehicle in accordance with the inter-vehicle distance to the following other vehicle, traveling speed, and the threshold has also been described, and its detail will be further described below.

Generally, it is said that a value obtained by subtracting 15 m from the traveling speed is necessary up to 60 km/h as a safe inter-vehicle distance to stop the vehicle after the detection of the danger. Therefore, the traveling speed of the vehicle is calculated from a vehicle speed pulse, and the distance to the following vehicle is calculated by the camera attached to the rear of the vehicle. In a case where the calculated distance is insufficient for a necessary inter-vehicle distance, a red arrow is displayed as the projection image to give warning to the following vehicle, and in a case where there is only a margin of, for example, 10% for the necessary inter-vehicle distance, attention is aroused by a yellow arrow. Also, the inter-vehicle distance to the following vehicle may be detected by a laser radar instead of the camera.

In addition, a stopping distance of a vehicle changes also depending on the state of the road surface. Generally, 1.5 times the inter-vehicle distance at normal time is necessary during rainfall, and 3 times the inter-vehicle distance at normal time is necessary during road surface freezing. Accordingly, setting of the necessary inter-vehicle distance calculated from the traveling speed described above is preferably changed in accordance with an ambient environment. For example, detection of rainfall is normally possible by an infrared sensor. Specifically, the detection can be realized by detecting a change in reflection due to adhesion of rain drops to window glass. Also, freezing of the road surface can be detected from specular reflectance of the road surface. Namely, diffuse reflection components due to unevenness on the surface are strong in a normal road surface, whereas specular reflection components are strong during freezing because an ice film is formed on the surface. As a result, for example, since specular reflection of the headlight emitted by the oncoming vehicle becomes strong, a freezing state can be detected by detecting the amount of reflected light on the road surface. Note that data of these safe/attention inter-vehicle distances are stored in the memory as a table in advance.

In the description above, since effective display cannot be performed particularly when the inter-vehicle distance to the other rear vehicle is not sufficient, the inter-vehicle distance is detected, and the projection image is displayed only when the sufficient inter-vehicle distance is kept, and the display is stopped when the distance is shorter than the predetermined inter-vehicle distance. However, other than that, in a case where there is not the sufficient inter-vehicle distance between the vehicle 10 and the other vehicle 10' in front of the vehicle 10, effective display cannot be performed as also illustrated in FIG. 34. Note that FIG. 34(A) illustrates a case where there is the sufficient inter-vehicle distance, FIG. 34(B) illustrates a case where the inter-vehicle distance is insufficient, and FIG. 34(C) illustrates a case where there is almost no inter-vehicle distance.

Figure 35:
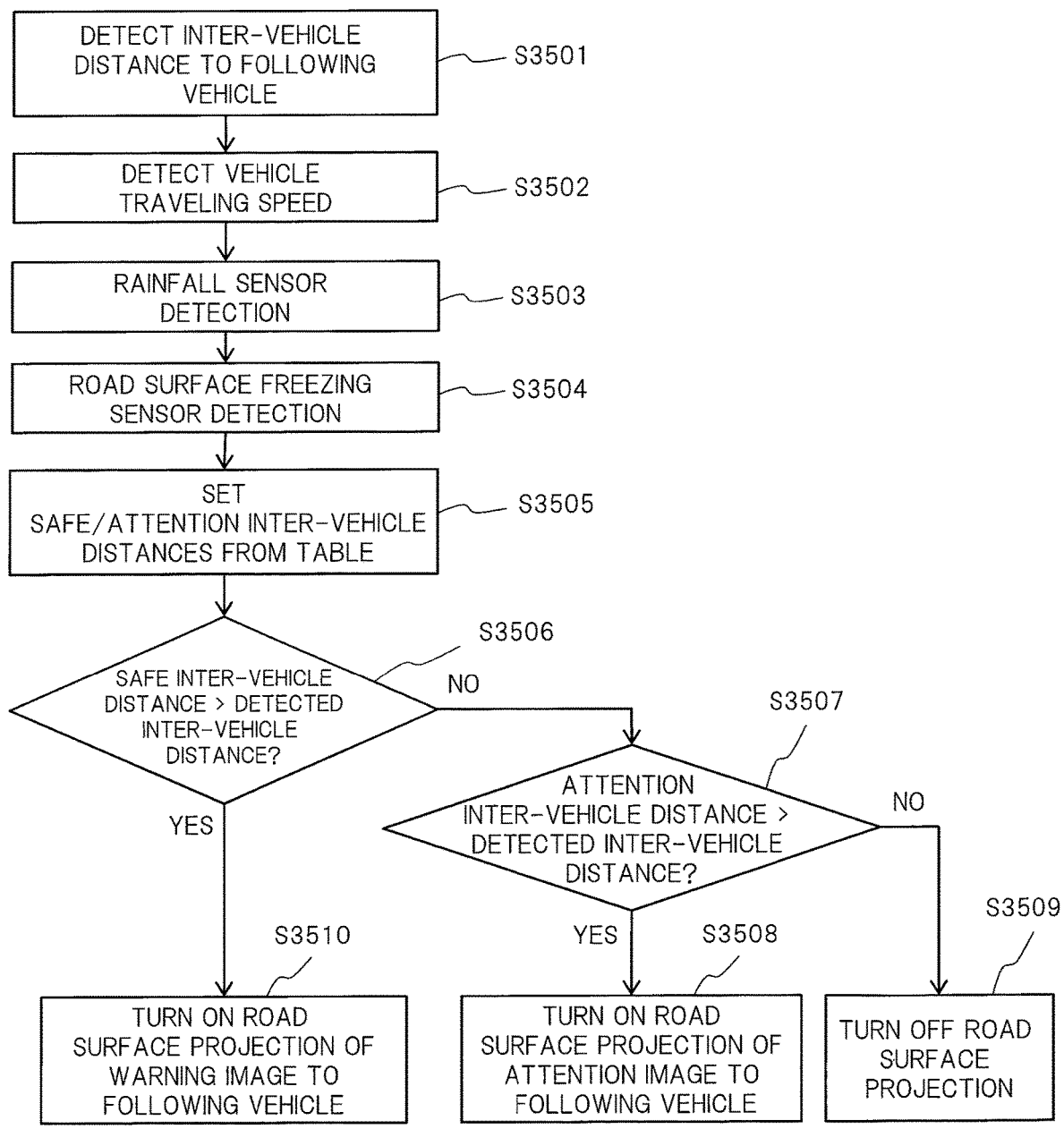
FIG. 35 is a diagram illustrating a further specific example of various images projected from a projector onto the road surface based on a relationship with vehicle information.

FIG. 35 illustrates an example of a processing flow for implementing warning to the following vehicle described above. In the figure, first, the inter-vehicle distance between the vehicle and the following vehicle is detected (S3501). Next, the traveling speed of the vehicle is detected (S3502). Then, presence/absence of rainfall is detected by the rainfall sensor described above (S3503). In addition, freezing of the road surface is detected by, for example, the road surface freezing sensor based on the principle described above (S3504). Thereafter, based on those detection results, the necessary safe/attention inter-vehicle distances are retrieved from the table described above to set each distance (S3505).

After that, it is determined whether or not the inter-vehicle distance detected above is shorter than the safe inter-vehicle distance set above (S3506). As a result, in a case where it is determined that the distance is longer than the safe inter-vehicle distance ("NO"), it is further determined whether or not the distance is shorter than the attention inter-vehicle distance (S3507). On the other hand, in a case where it is determined that the distance is shorter than the safe inter-vehicle distance ("YES") in the determination (S3506), projection of the warning image to the following vehicle described above onto the road surface is performed (ON) (S3510).

Meanwhile, in a case where it is determined that the distance is longer than the safe inter-vehicle distance ("NO") in the determination (S3506) but it is determined that the distance is shorter than the attention inter-vehicle distance ("YES") in the determination (S3507), the attention image to the following vehicle is projected on the road surface (ON) instead of the warning image (S3508). Then, in a case where it is determined that the distance is longer than the safe inter-vehicle distance ("NO") in the determination (S3506) and it is further determined that the distance is longer than the attention inter-vehicle distance ("NO") in the determination (S3507), display of the safe/attention information to the following vehicle described above is stopped (OFF) (S3509). Note that the processing described above may be performed by, for example, the CPU (Central Processing Unit) 41 of the light control ECU 40 also illustrated in FIG. 4 above.

When an image is to be displayed in addition to the warning to the following vehicle described above, sufficient display cannot be made depending on the image to be displayed unless there is at least a space corresponding to one vehicle. Accordingly, it has been found that it is desirable that the image is not displayed when the inter-vehicle distances to the front vehicle and the rear vehicle are narrower than the image to be displayed. For example, in a case where an image of 4 m width is displayed on the road surface 10 m ahead, for example, the image is observed as a 600 mm square image 10 m ahead from a target person with a height of 170 cm. At that time, since the target person can recognize a size of 30 mm or more 10 m ahead if the target person has unaided vision of 0.1 or more, it can be seen that it is possible to perform display with the resolution of 16.times.16 or more necessary for character display.

Figure 36:
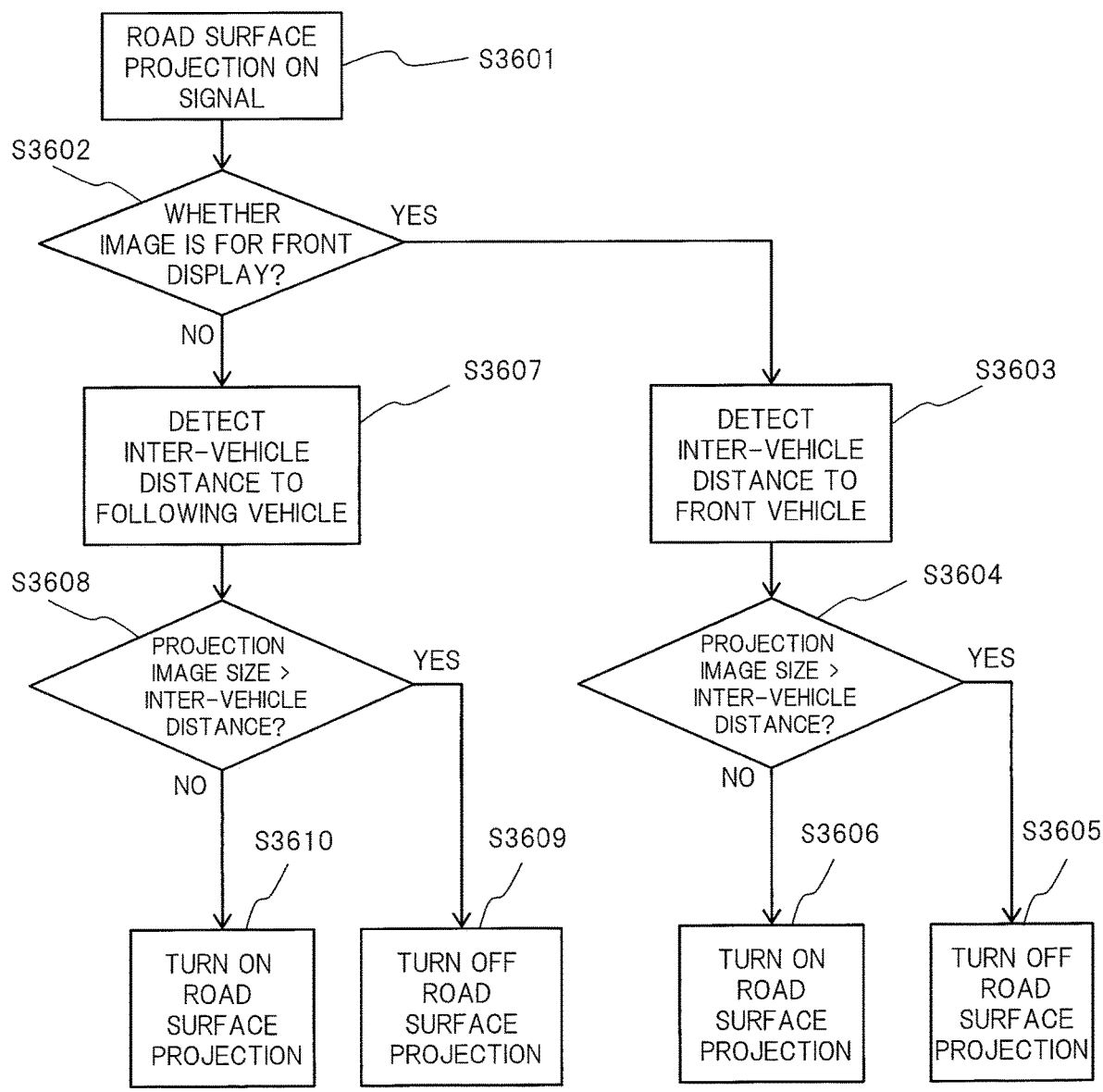
FIG. 36 is a diagram illustrating a further specific example of various images projected from a projector onto the road surface based on a relationship with vehicle information.

FIG. 36 illustrates an example of processing flow for performing image projection on the road surface based on the findings described above. In the figure, first, when the road surface projection ON signal is received (S3601), it is determined whether or not the image to be projected is displayed ahead of the vehicle (S3602).

As a result of the determination above, in a case where it is determined that the image to be displayed is an image to be displayed ahead of the vehicle ("YES"), next, the inter-vehicle distance between the vehicle and a front vehicle is detected (S3603). Subsequently, it is determined whether or not the size of the image to be projected ahead of the vehicle is larger than the inter-vehicle distance detected above (S3604). As a result, in a case where the size of the image is larger than the inter-vehicle distance ("YES"), projection of the image onto the road surface is stopped (OFF) (S3605). On the other hand, in a case where the size is smaller than the inter-vehicle distance ("NO"), projection of the image onto the road surface is performed (ON) (S3606).

Meanwhile, as a result of the determination above (S3602), in a case where it is determined that the image to be displayed is an image to be displayed behind the vehicle ("NO"), an inter-vehicle distance between the vehicle and a rear vehicle is detected (S3607). Subsequently, it is determined whether or not the size of the image to be projected behind the vehicle is larger than the inter-vehicle distance detected above (S3608). As a result, in a case where the size of the image is larger than the inter-vehicle distance ("YES"), projection of the image onto the road surface is stopped (OFF) (S3609). On the other hand, in a case where the size is smaller than the inter-vehicle distance ("NO"), projection of the image onto the road surface is performed (ON) (S3510).

Note that, in the embodiment described above, for example, the lattice pattern, the rectangular image, or the simple rectangular frame has been described as the image inserted in the projection image for detecting distortion of the road surface or detecting the obstacle. In that case, it is preferable to use light in a wavelength band centered on a wavelength of 1.4 μm that is light with spectral intensity referred to as "AM1.5". This is because some of the wavelength components of sunlight outside the atmosphere are absorbed by components in the atmosphere and do not reach the ground, and some of the spectral components are reduced or eliminated in the spectral intensity referred to as "AM1.5" and the intensity is substantially zero (0) particularly in the wavelength band centered on a wavelength of 1.4 μm in the near infrared region. In other words, this is because the sunlight does not contain the AM1.5 on the ground where the vehicle runs. Namely, it is possible to stably obtain road surface condition information without being affected by the sunlight if the light described above is used.

Figure 37:
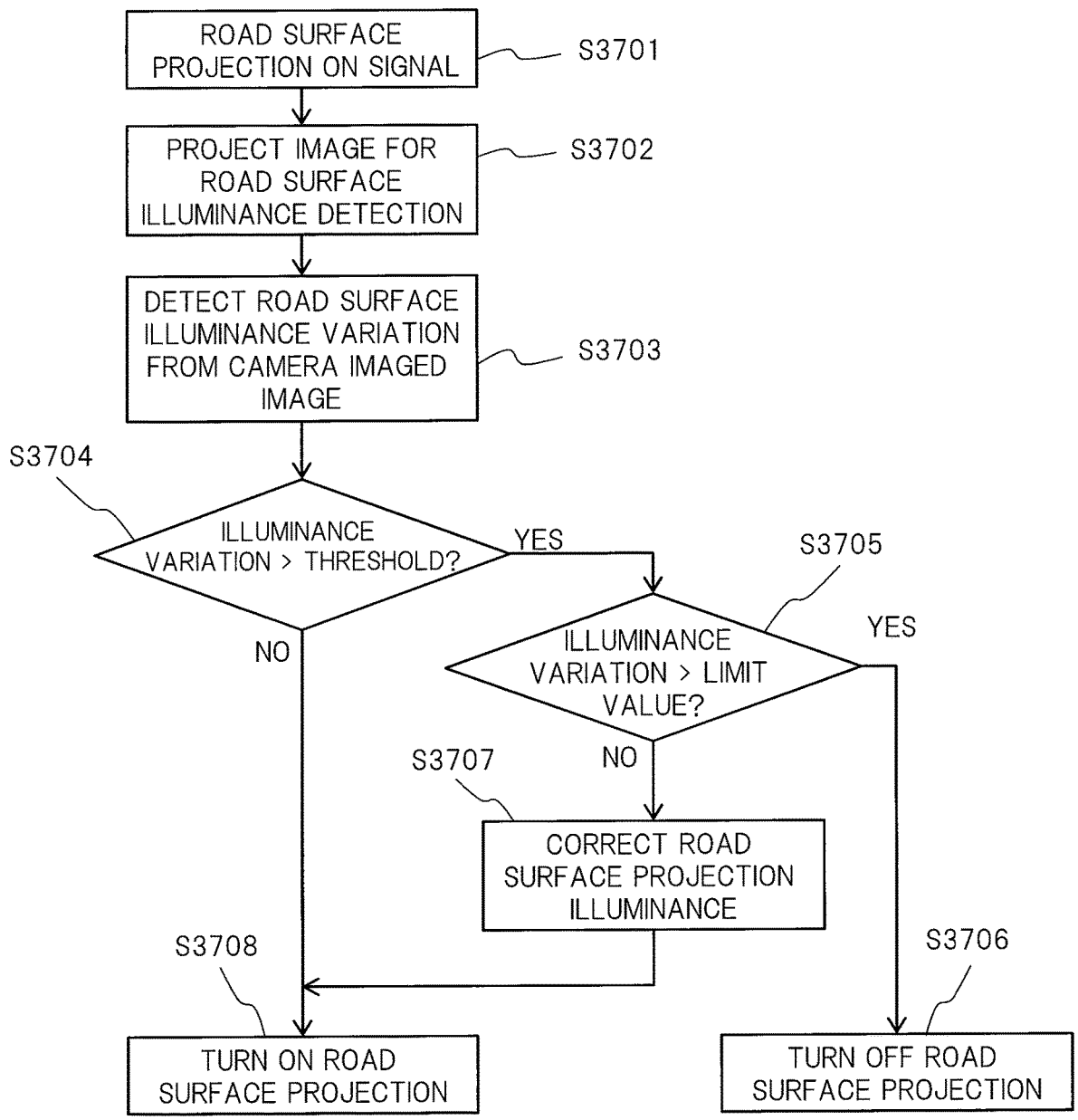
FIG. 37 is a diagram illustrating a further specific example of various images projected from a projector onto the road surface based on a relationship with vehicle information.

In addition, the correction of the brightness of the projection image described above will be described in detail below with reference to FIG. 37. Note that, similarly to the above, the processing of the flowchart in this figure may be performed by, for example, the CPU (Central Processing Unit) 41 of the light control ECU 40 also illustrated in FIG. 4 above.

First, when the road surface projection ON signal is received (S3701), an image for road surface illuminance detection is projected on the road surface (S3702). The image for road surface illuminance detection is the image of full white display described above (image containing color light of R, G, and B). Further, during the full white display, nonuniformity (so-called variation) of road surface illuminance is detected from the image imaged by the camera (S3703). Subsequently, the variation of detected illuminance (or each value) is compared with a predetermined threshold (S3704).

As a result of the comparison above, in a case where the variation of illuminance is larger than the threshold ("YES"), it is further determined whether or not the variation of illuminance is larger than a limit value (S3705). Note that the limit value means a value indicating the limit of a range capable of correcting the brightness by the light source of the image projection apparatus. As a result, in a case where it is determined that the variation is larger than the limit value ("YES"), projection of the image onto the road surface is stopped (OFF) (S3706).

On the other hand, in a case where it is determined that the variation is smaller than the limit value ("NO"), illuminance correction of the image to be projected on the road surface is performed (S3707), and in a case where the variation of illuminance is smaller than the threshold ("NO") in the comparison above (S3704), projection of the image onto the road surface is executed (ON) (S3708).

According to the above embodiments, an image that is excellent in visibility and is easily recognizable is obtained, so that it is possible to project the image intended by the driver on the road surface reliably and clearly. Further, if the correction of the brightness of the projection image described above is performed (for example, sequentially) by using a monochromatic pattern of red (R), green (G), or blue (B) as the image for road surface illuminance detection instead of the image of full white display described above, variation of each color can be detected, so that color shift correction can also be performed.

Note that the present invention is not limited to the embodiments described above, and includes various modification examples. For example, the above embodiments have described the entire system in detail in order to make the present invention easily understood, and the present invention is not necessarily limited to those having all the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

10 . . . vehicle (passenger car), 10' . . . other vehicle, 11 . . . headlight, 12 . . . window part, 13, 13' . . . tail lamp, 14 . . . side mirror, 40 . . . light control ECU, 51 . . . direction indicator sensor, 52 . . . steering wheel angle sensor, 53 . . . shift position sensor, 54 . . . vehicle speed sensor, 55 . . . accelerator operation sensor, 56 . . . brake operation sensor, 57 . . . illuminance sensor, 58 . . . chromaticity sensor, 59 . . . engine start sensor, 60 . . . hazard lamp sensor, 61 . . . camera, 62 . . . image processing unit, 63 . . . GPS receiving unit, 64 . . . map information output unit, 66 . . . headlight sensor, 67 . . . high/low sensor, 68 . . . doorknob sensor, 69 . . . door lock sensor, 70 . . . human sensor, 71 . . . transmission sensor, 100 . . . projector, 110 . . . projection signal output unit, 120 . . . control unit, 500 . . . image projection apparatus, 501 . . . projection optical system, 502 . . . display device, 503 . . . display device driving unit, 504 . . . illumination optical system, 505 . . . light source, 531 . . . image signal input unit, 533 . . . audio signal input unit, 532 . . . communication unit

What is claimed is:

1. An image projection apparatus comprising:
one or more sensors configured to acquire information relating to a vehicle;
a projector configured to project an image on a road surface,
a processor communicatively coupled to a navigation device, the one or more sensors and the projector,
wherein the projector is further configured to project the image based on information acquired by the one or more sensors and information from the navigation device received by the processor, and
wherein, when the image includes a character image based on the information from the navigation device and a traveling speed of the vehicle acquired by the one or more sensors is greater than a predetermined speed, the projector does not project the image on the road surface, and
wherein, when the image does not include the character image based on the information from the navigation device and the traveling speed of the vehicle acquired by the one or more sensors is greater than the predetermined speed, the projector projects the image on the road surface.

2. The image projection apparatus according to claim 1, wherein the processor controls the projector to project the image to different projection positions in accordance with the information from the navigation device.

3. The image projection apparatus according to claim 2, wherein the projection positions include a driving lane of the vehicle, an opposite lane of the vehicle, and a position other than the driving lane or the opposite lane.

4. The image projection apparatus according to claim 2, wherein the processor controls the projector to project alert information received from the navigation device to a portion of the road surface of an opposite lane of the vehicle.

5. The image projection apparatus according to claim 2, wherein the processor controls the projector to project distance information to a destination received from the navigation device to a position other than a lane of the road surface.

6. The image projection apparatus according to claim 2, wherein the processor controls the projector to project at least one of a traveling direction information of the vehicle, a traveling speed information of the vehicle, and remaining fuel information of the vehicle to a portion of the road surface of a driving lane of the vehicle.

7. An image projection method comprising the steps of:
acquiring information relating to a vehicle;
communicating with a navigation device; and
projecting an image onto a road surface,
wherein the image is based on the information relating to the vehicle and information received by the navigation device,
wherein, when the image includes a character image based on the information from the navigation device and a traveling speed of the vehicle is greater than a predetermined speed, the image is not projected onto the road surface, wherein, when the image does not include the character image based on the information from the navigation device and the traveling speed of the vehicle acquired by the one or more sensors is greater than the predetermined speed, the image is projected onto the road surface.

8. The image projection method according to claim 7, wherein the image is projected to different projection positions in accordance with the information from the navigation device.

9. The image projection method according to claim 8, wherein the projection positions include a driving lane of the vehicle, an opposite lane of the vehicle, and a position other than the driving lane or the opposite lane.

10. The image projection method according to claim 8, further comprising the step of:
projecting alert information received from the navigation device to a portion of the road surface of an opposite lane of the vehicle.

11. The image projection method according to claim 8, further comprising the step of:
projecting distance information to a destination received from the navigation device to a position other than a lane of the road surface.

12. The image projection method according to claim 8, further comprising the step
projecting at least one of a traveling direction information of the vehicle, a traveling speed information of the vehicle, and a remaining fuel information of the vehicle to a portion of the road surface of a driving lane of the vehicle.

* * * * *